US010192220B2

(12) United States Patent
Varma et al.

(10) Patent No.: US 10,192,220 B2
(45) Date of Patent: Jan. 29, 2019

(54) INTEGRATED ONLINE AND OFFLINE INVENTORY MANAGEMENT

(71) Applicant: Square, Inc., San Francisco, CA (US)

(72) Inventors: Ajit Kalidindi Varma, San Francisco, CA (US); Joseph Loree Robinson, San Francisco, CA (US); Jesse Reiss, San Francisco, CA (US); Andrew Lin, New York, NY (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/312,397

(22) Filed: Jun. 23, 2014

(65) Prior Publication Data

US 2014/0379536 A1 Dec. 25, 2014

Related U.S. Application Data

(60) Provisional application No. 61/839,098, filed on Jun. 25, 2013.

(51) Int. Cl.
*G06Q 10/08* (2012.01)
*G06Q 20/40* (2012.01)
*G06Q 30/06* (2012.01)

(52) U.S. Cl.
CPC ......... *G06Q 20/409* (2013.01); *G06Q 10/087* (2013.01); *G06Q 30/06* (2013.01)

(58) Field of Classification Search
CPC .................................................. G06Q 10/087
(Continued)

(56) References Cited

U.S. PATENT DOCUMENTS 5,652,421 A 7/1997 Veeneman et al.
5,878,337 A 3/1999 Joao et al.
(Continued)

FOREIGN PATENT DOCUMENTS

AU 2017235924 A1 10/2017
CA 2 916 603 A1 12/2014
(Continued)

OTHER PUBLICATIONS

*Uber*. Google Play. Published on Nov. 10, 2014. Retrieved from the internet on Nov. 12, 2014. Retrieved from the internet: URL<https://play.google.com/store/apps/details?id=com.ubercab&hl=en>. 2 pages.
(Continued)

*Primary Examiner* — Ashford S Hayles
(74) *Attorney, Agent, or Firm* — Lee & Hayes, PC

(57) ABSTRACT

Method, systems, and apparatus for integrated online and offline sales management. A system manages both offline and online transactions and inventory in an integrated environment. An offline transaction is a sale at a point of sale (POS) system, e.g., at a typical "brick and mortar shop" physical store. An online transaction is a sale using an online store, e.g., an online shopping cart and checkout system accessed by a web browser or other application. An online store can be converted to offline store, and vice versa. An inventory management system can receive an input from a merchant device of merchant designating an item carried by the merchant as an item to be sold at the physical store, at the online store, or both. The inventory management system can modify a record of the item to respond to the input.

21 Claims, 14 Drawing Sheets

(58) Field of Classification Search
USPC .......................................................... 705/28
See application file for complete search history.

(56) References Cited

U.S. PATENT DOCUMENTS

| | | | |
|---|---|---|---|
| 5,960,411 A | 9/1999 | Hartman et al. | |
| 6,154,738 A * | 11/2000 | Call | G06Q 20/201 |
| | | | 705/20 |
| 6,263,352 B1 | 7/2001 | Cohen | |
| 6,330,544 B1 | 12/2001 | Walker et al. | |
| 6,343,275 B1 * | 1/2002 | Wong | G06Q 10/0633 |
| | | | 705/26.1 |
| 7,085,812 B1 | 8/2006 | Sherwood | |
| 7,155,411 B1 | 12/2006 | Blinn et al. | |
| 7,233,843 B2 | 6/2007 | Budhraja et al. | |
| 7,257,552 B1 * | 8/2007 | Franco | G06Q 10/08 |
| | | | 705/26.2 |
| 7,376,600 B1 * | 5/2008 | Wadawadigi | G06Q 10/087 |
| | | | 705/26.4 |
| 7,475,024 B1 * | 1/2009 | Phan | G06Q 10/087 |
| | | | 705/22 |
| 7,478,054 B1 | 1/2009 | Adams et al. | |
| 7,493,390 B2 | 2/2009 | Bobde et al. | |
| 7,552,087 B2 | 6/2009 | Schultz et al. | |
| 7,575,166 B2 | 8/2009 | McNamara | |
| 7,603,382 B2 | 10/2009 | Halt, Jr. | |
| 7,764,185 B1 | 7/2010 | Manz et al. | |
| 7,810,729 B2 | 10/2010 | Morley, Jr. | |
| 7,818,809 B1 | 10/2010 | Sobel et al. | |
| 8,060,259 B2 | 11/2011 | Budhraja et al. | |
| 8,112,066 B2 | 2/2012 | Ben Ayed | |
| 8,266,551 B2 | 9/2012 | Boldyrev et al. | |
| 8,401,710 B2 | 3/2013 | Budhraja et al. | |
| 8,423,459 B1 | 4/2013 | Green et al. | |
| 8,434,682 B1 | 5/2013 | Argue et al. | |
| 8,498,888 B1 | 7/2013 | Raff et al. | |
| 8,577,810 B1 | 11/2013 | Dalit et al. | |
| 8,602,296 B1 | 12/2013 | Velline et al. | |
| 8,630,586 B2 | 1/2014 | Dvortsov et al. | |
| 8,676,119 B2 | 3/2014 | Cohen et al. | |
| 8,744,919 B1 * | 6/2014 | O'Dea | G06Q 10/087 |
| | | | 705/26.1 |
| 8,855,312 B1 | 10/2014 | Hodgman et al. | |
| 8,859,337 B2 | 10/2014 | Gaul et al. | |
| 8,892,462 B1 | 11/2014 | Borovsky et al. | |
| 8,972,298 B2 | 3/2015 | Kunz et al. | |
| 9,064,249 B1 | 6/2015 | Borovsky et al. | |
| 9,195,985 B2 | 11/2015 | Domenica et al. | |
| 9,542,681 B1 | 1/2017 | Borovsky et al. | |
| 9,652,751 B2 | 5/2017 | Aaron et al. | |
| 9,704,146 B1 | 7/2017 | Morgan et al. | |
| 9,721,251 B1 | 8/2017 | Jen et al. | |
| 2002/0049622 A1 * | 4/2002 | Lettich | G06Q 10/063 |
| | | | 705/7.11 |
| 2002/0091646 A1 | 7/2002 | Lake et al. | |
| 2002/0095457 A1 * | 7/2002 | Sharma | G06Q 10/06 |
| | | | 709/203 |
| 2002/0138316 A1 * | 9/2002 | Katz | G06Q 10/06311 |
| | | | 705/7.13 |
| 2002/0138317 A1 * | 9/2002 | Mok | G06Q 10/06 |
| | | | 700/44 |
| 2003/0014317 A1 * | 1/2003 | Siegel | G06Q 10/087 |
| | | | 705/22 |
| 2003/0115285 A1 * | 6/2003 | Lee | G06Q 10/06 |
| | | | 709/217 |
| 2003/0204447 A1 | 10/2003 | Dalzell et al. | |
| 2004/0030601 A1 | 2/2004 | Pond et al. | |
| 2004/0153359 A1 * | 8/2004 | Ho | G06Q 10/06 |
| | | | 705/7.25 |
| 2004/0193489 A1 | 9/2004 | Boyd et al. | |
| 2004/0215520 A1 | 10/2004 | Butler et al. | |
| 2005/0055582 A1 | 3/2005 | Bazakos et al. | |
| 2005/0097005 A1 * | 5/2005 | Fargo | G06Q 30/00 |
| | | | 705/26.62 |
| 2005/0125313 A1 * | 6/2005 | Untiedt | G06Q 10/087 |
| | | | 705/28 |
| 2005/0187833 A1 * | 8/2005 | Royer | G06Q 10/087 |
| | | | 705/28 |
| 2005/0246245 A1 | 11/2005 | Satchell et al. | |
| 2005/0261928 A1 * | 11/2005 | Skeadas | G06Q 30/02 |
| | | | 705/346 |
| 2006/0064373 A1 | 3/2006 | Kelley | |
| 2006/0085333 A1 | 4/2006 | Wah et al. | |
| 2006/0149637 A1 * | 7/2006 | Zellner | G06Q 10/087 |
| | | | 705/14.23 |
| 2006/0195563 A1 * | 8/2006 | Chapin | G06Q 10/087 |
| | | | 709/223 |
| 2006/0229756 A1 * | 10/2006 | Aiso | G06Q 10/06 |
| | | | 700/99 |
| 2006/0261149 A1 | 11/2006 | Raghavendra Tulluri | |
| 2007/0043602 A1 * | 2/2007 | Ettl | G06Q 10/06311 |
| | | | 705/7.13 |
| 2007/0069013 A1 | 3/2007 | Seifert et al. | |
| 2007/0073619 A1 | 3/2007 | Smith | |
| 2007/0174146 A1 * | 7/2007 | Tamarkin | G06Q 10/087 |
| | | | 705/28 |
| 2007/0208930 A1 | 9/2007 | Blank et al. | |
| 2008/0035725 A1 | 2/2008 | Jambunathan et al. | |
| 2008/0037442 A1 | 2/2008 | Bill | |
| 2008/0040265 A1 | 2/2008 | Rackley, III et al. | |
| 2008/0133351 A1 | 6/2008 | White et al. | |
| 2008/0177624 A9 | 7/2008 | Dohse | |
| 2008/0197188 A1 | 8/2008 | Jagatic et al. | |
| 2008/0255968 A1 * | 10/2008 | Heinrichs | G06Q 10/087 |
| | | | 705/28 |
| 2008/0262925 A1 | 10/2008 | Kim et al. | |
| 2008/0277465 A1 | 11/2008 | Pletz et al. | |
| 2008/0296978 A1 | 12/2008 | Finkenzeller et al. | |
| 2009/0070228 A1 | 3/2009 | Ronen | |
| 2009/0106138 A1 | 4/2009 | Smith et al. | |
| 2009/0112766 A1 | 4/2009 | Hammad et al. | |
| 2009/0259527 A1 * | 10/2009 | Yang | G06Q 10/06 |
| | | | 705/28 |
| 2009/0271265 A1 | 10/2009 | Lay et al. | |
| 2009/0276293 A1 * | 11/2009 | Zellner | G06Q 10/087 |
| | | | 705/14.4 |
| 2009/0288012 A1 | 11/2009 | Hertel et al. | |
| 2009/0313132 A1 | 12/2009 | McKenna et al. | |
| 2009/0319421 A1 | 12/2009 | Mathis et al. | |
| 2010/0076777 A1 | 3/2010 | Paretti et al. | |
| 2010/0082420 A1 | 4/2010 | Trifiletti et al. | |
| 2010/0174596 A1 | 7/2010 | Gilman et al. | |
| 2010/0223145 A1 | 9/2010 | Dragt | |
| 2010/0269059 A1 | 10/2010 | Othmer et al. | |
| 2011/0047013 A1 | 2/2011 | McKenzie, III | |
| 2011/0055084 A1 | 3/2011 | Singh | |
| 2011/0071892 A1 | 3/2011 | Dickelman | |
| 2011/0087550 A1 | 4/2011 | Fordyce, III et al. | |
| 2011/0145052 A1 | 6/2011 | Lin et al. | |
| 2011/0178883 A1 | 7/2011 | Granbery et al. | |
| 2011/0180598 A1 | 7/2011 | Morgan et al. | |
| 2011/0251892 A1 | 10/2011 | Laracey | |
| 2011/0258014 A1 * | 10/2011 | Evangelist | G06Q 10/06313 |
| | | | 705/7.23 |
| 2011/0258689 A1 | 10/2011 | Cohen et al. | |
| 2011/0302019 A1 | 12/2011 | Proctor, Jr. et al. | |
| 2011/0302080 A1 | 12/2011 | White et al. | |
| 2011/0313867 A9 | 12/2011 | Silver | |
| 2011/0320345 A1 | 12/2011 | Taveau et al. | |
| 2012/0011072 A1 | 1/2012 | Lodolo | |
| 2012/0016731 A1 | 1/2012 | Smith et al. | |
| 2012/0017082 A1 * | 1/2012 | Davies | G06Q 10/06 |
| | | | 713/156 |
| 2012/0029990 A1 | 2/2012 | Fisher | |
| 2012/0030044 A1 | 2/2012 | Hurst | |
| 2012/0046958 A1 * | 2/2012 | Pynadath | G06Q 20/12 |
| | | | 705/1.1 |
| 2012/0059701 A1 | 3/2012 | van der Veen et al. | |
| 2012/0059758 A1 | 3/2012 | Carlson | |
| 2012/0084210 A1 | 4/2012 | Farahmand | |
| 2012/0089418 A1 | 4/2012 | Kamath et al. | |
| 2012/0095867 A1 | 4/2012 | McKelvey | |

(56) References Cited

U.S. PATENT DOCUMENTS

| | | |
|---|---|---|
| 2012/0095871 A1 | 4/2012 | Dorsey et al. |
| 2012/0110568 A1 | 5/2012 | Abel et al. |
| 2012/0150611 A1 | 6/2012 | Isaacson et al. |
| 2012/0150742 A1 | 6/2012 | Poon et al. |
| 2012/0185306 A1 | 7/2012 | Cheng |
| 2012/0209773 A1 | 8/2012 | Ranganathan |
| 2012/0244885 A1 | 9/2012 | Hefetz |
| 2012/0254031 A1 | 10/2012 | Walker et al. |
| 2012/0271725 A1 | 10/2012 | Cheng |
| 2012/0278727 A1 | 11/2012 | Ananthakrishnan et al. |
| 2012/0284036 A1 | 11/2012 | Evans |
| 2012/0290422 A1 | 11/2012 | Bhinder |
| 2012/0290609 A1 | 11/2012 | Britt |
| 2012/0296679 A1 | 11/2012 | Im |
| 2012/0323685 A1 | 12/2012 | Ullah |
| 2013/0006773 A1 | 1/2013 | Lutnick et al. |
| 2013/0024341 A1 | 1/2013 | Jeon et al. |
| 2013/0030889 A1 | 1/2013 | Davich et al. |
| 2013/0048719 A1 | 2/2013 | Bennett |
| 2013/0050080 A1 | 2/2013 | Dahl et al. |
| 2013/0054320 A1 | 2/2013 | Dorso et al. |
| 2013/0065672 A1 | 3/2013 | Gelman et al. |
| 2013/0066783 A1 | 3/2013 | Wolff |
| 2013/0073363 A1 | 3/2013 | Boal |
| 2013/0103574 A1 | 4/2013 | Conrad et al. |
| 2013/0103946 A1 | 4/2013 | Binenstock |
| 2013/0117329 A1 | 5/2013 | Bank et al. |
| 2013/0124333 A1 | 5/2013 | Doughty et al. |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0151613 A1 | 6/2013 | Dhawan et al. |
| 2013/0159172 A1 | 6/2013 | Kim |
| 2013/0159446 A1 | 6/2013 | Carlson et al. |
| 2013/0166402 A1 | 6/2013 | Parento et al. |
| 2013/0179227 A1 | 7/2013 | Booth et al. |
| 2013/0198018 A1 | 8/2013 | Baig |
| 2013/0204727 A1 | 8/2013 | Rothschild |
| 2013/0218721 A1 | 8/2013 | Borhan et al. |
| 2013/0225081 A1 | 8/2013 | Doss et al. |
| 2013/0236109 A1 | 9/2013 | Madden et al. |
| 2013/0238382 A1* | 9/2013 | Schierholt .......... G06Q 10/0631 705/7.25 |
| 2013/0246207 A1 | 9/2013 | Novak et al. |
| 2013/0246280 A1 | 9/2013 | Kirsch |
| 2013/0246301 A1 | 9/2013 | Radhakrishnan et al. |
| 2013/0268431 A1 | 10/2013 | Mohsenzadeh |
| 2013/0290173 A1 | 10/2013 | Nemeroff |
| 2013/0290522 A1 | 10/2013 | Behm, Jr. |
| 2013/0291018 A1 | 10/2013 | Billings et al. |
| 2013/0297933 A1 | 11/2013 | Fiducia et al. |
| 2013/0317835 A1 | 11/2013 | Mathew |
| 2013/0317950 A1 | 11/2013 | Abraham et al. |
| 2013/0332385 A1 | 12/2013 | Kilroy et al. |
| 2013/0339199 A1* | 12/2013 | Patt ..................... G06Q 10/087 705/28 |
| 2013/0346223 A1 | 12/2013 | Prabhu et al. |
| 2014/0012754 A1 | 1/2014 | Hanson et al. |
| 2014/0019236 A1 | 1/2014 | Argue et al. |
| 2014/0025446 A1 | 1/2014 | Nagarajan et al. |
| 2014/0057667 A1 | 2/2014 | Blankenship et al. |
| 2014/0058861 A1 | 2/2014 | Argue et al. |
| 2014/0081853 A1 | 3/2014 | Sanchez et al. |
| 2014/0081854 A1 | 3/2014 | Sanchez et al. |
| 2014/0096179 A1 | 4/2014 | Ben-Shalom et al. |
| 2014/0099888 A1 | 4/2014 | Flanagan et al. |
| 2014/0108245 A1 | 4/2014 | Drummond et al. |
| 2014/0114781 A1 | 4/2014 | Watanabe |
| 2014/0122345 A1 | 5/2014 | Argue et al. |
| 2014/0129135 A1 | 5/2014 | Holden et al. |
| 2014/0129302 A1 | 5/2014 | Amin et al. |
| 2014/0129357 A1 | 5/2014 | Goodwin |
| 2014/0129951 A1 | 5/2014 | Amin et al. |
| 2014/0136318 A1 | 5/2014 | Alberth, Jr. et al. |
| 2014/0156508 A1 | 6/2014 | Argue et al. |
| 2014/0180805 A1 | 6/2014 | Argue et al. |
| 2014/0184505 A1 | 7/2014 | Fullerton et al. |
| 2014/0207669 A1 | 7/2014 | Rosenberg |
| 2014/0236762 A1 | 8/2014 | Gerber et al. |
| 2014/0249947 A1 | 9/2014 | Hicks et al. |
| 2014/0254820 A1 | 9/2014 | Gardenfors et al. |
| 2014/0257958 A1 | 9/2014 | Andrews |
| 2014/0278589 A1 | 9/2014 | Rados et al. |
| 2014/0279184 A1 | 9/2014 | Lai et al. |
| 2014/0379497 A1 | 12/2014 | Varma et al. |
| 2014/0379580 A1 | 12/2014 | Varma et al. |
| 2015/0025983 A1 | 1/2015 | Cicerchi |
| 2015/0112838 A1* | 4/2015 | Li ..................... H04W 4/206 705/26.61 |
| 2015/0134439 A1 | 5/2015 | Maxwell et al. |
| 2015/0187021 A1 | 7/2015 | Moring et al. |
| 2015/0294312 A1 | 10/2015 | Kendrick et al. |
| 2015/0332223 A1 | 11/2015 | Aaron et al. |

FOREIGN PATENT DOCUMENTS

| | | |
|---|---|---|
| CA | 2 930 186 A1 | 5/2015 |
| GB | 2530451 A | 3/2016 |
| KR | 10-2006-0103089 A | 9/2006 |
| WO | 2014/210020 A1 | 12/2014 |
| WO | 2015/069389 A1 | 5/2015 |
| WO | 2015/100378 A1 | 7/2015 |
| WO | 2015/179316 A1 | 11/2015 |

OTHER PUBLICATIONS

International Search Report and Written Opinion dated Dec. 10, 2014, for International Patent Application No. PCT/US2014/043891, filed Jun. 24, 2014.
Non-Final Office Action dated Aug. 10, 2016, for U.S. Appl. No. 14/312,433, of Varma, A.K., et al., filed Jun. 23, 2014.
Non-Final Office Action dated Sep. 8, 2016, for U.S. Appl. No. 14/312,371, of Varma, A.K., et al., filed Jun. 23, 2014.
Examination Report No. 1 for Australian Patent Application No. 2014302661, dated Sep. 27, 2016.
Non-Final Office Action dated Sep. 22, 2016, for U.S. Appl. No. 14/182,655, of Spindel, N., et al., filed Feb. 18, 2014.
Advisory Action dated Sep. 29, 2016, for U.S. Appl. No. 14/329,658, of Aaron, P., et al., filed Jul. 11, 2014.
Final Office Action dated Oct. 11, 2016, for U.S. Appl. No. 13/829,080, of Morgan, T.B., et al., filed Mar. 14, 2013.
Final Office Action dated Nov. 1, 2016, for U.S. Appl. No. 14/160,490, of Moring, D., et al., filed Jan. 21, 2014.
Final Office Action dated Nov. 10, 2016, for U.S. Appl. No. 13/830,350, of Morgan, T.B., et al., filed Mar. 14, 2013.
Non-Final Office Action dated Nov. 17, 2016, for U.S. Appl. No. 14/701,571, of Jen, M., et al., filed May 1, 2015.
Advisory Action dated Nov. 28, 2016, for U.S. Appl. No. 14/062,617, of Templeton, T., et al., filed Oct. 24, 2013.
Final Office Action dated Nov. 29, 2016, for U.S. Appl. No. 14/088,113, of Maxwell, D.W., et al., filed Nov. 22, 2013.
Final Office Action dated Dec. 12, 2016, for U.S. Appl. No. 14/088,141, of Maxwell, D.W., et al., filed Nov. 22, 2013.
Examination Report No. 1 for Australian Patent Application No. 2014347192, dated Dec. 15, 2016.
Notice of Allowance dated Jan. 13, 2017, for U.S. Appl. No. 14/329,658, of Aaron, P., et al., filed Jul. 11, 2014.
Final Office Action dated Jan. 27, 2017, for U.S. Appl. No. 14/329,638, of Aaron, P., et al., filed Jul. 11, 2014.
Examiner's Requisition for Canadian Patent Application No. 2,930,186, dated Jan. 30, 2017.
Notice of Acceptance for Australian Patent Application No. 2014347192, dated Feb. 16, 2017.
Corrected Notice of Allowance dated Feb. 27, 2017, for U.S. Appl. No. 14/329,658, of Aaron, P. et al., filed Jul. 11, 2014.
Notice of Allowance dated Mar. 2, 2017, for U.S. Appl. No. 13/829,080, of Morgan, T.B., et al., filed Mar. 14, 2013.

(56) References Cited

OTHER PUBLICATIONS

Non-Final Office Action dated Mar. 15, 2017, for U.S. Appl. No. 13/829,658, of Morgan, T.B., et al., filed Mar. 14, 2013.
Notice of Allowance dated Mar. 23, 2017, for U.S. Appl. No. 14/701,571, of Jen, M., et al., filed May 1, 2015.
Non-Final Office Action dated Apr. 18, 2017, for U.S. Appl. No. 14/160,490, of Moring, D., et al., filed Jan. 21, 2014.
Final Office Action dated Apr. 19, 2017, for U.S. Appl. No. 14/312,433, of Varma, A.K., et al., filed Jun. 23, 2014.
Final Office Action dated Apr. 27, 2017, for U.S. Appl. No. 14/312,371, of Varma, A.K., et al., filed Jun. 23, 2014.
Non-Final Office Action dated Jun. 19, 2017, for U.S. Appl. No. 14/730,860, of Sasmaz, Y., et al., filed Jun. 4, 2015.
Advisory Action dated Jun. 30, 2017, for U.S. Appl. No. 14/312,433, of Varma, A.K., et al., filed Jun. 23, 2014.
Non-Final Office Action dated Jul. 10, 2017, for U.S. Appl. No. 13/830,350, of Morgan, T.B., et al., filed Mar. 14, 2013.
Advisory Action dated Jul. 11, 2017, for U.S. Appl. No. 14/312,371, of Varma, A.K., et al., filed Jun. 23, 2014.
Examination Report No. 1 for Australian Patent Application No. 2015264426, dated Jul. 11, 2017.
International Search Report and Written Opinion for International Application No. PCT/US2014/058398, dated Dec. 24, 2014.
International Search Report and Written Opinion for International Application No. PCT/US2014/072269, dated Mar. 31, 2015.
International Search Report and Written Opinion for International Application No. PCT/US2015/031423, dated Aug. 13, 2015.
Munson, J., and Gupta, V.K., "Location-Based Notification as a General-Purpose Service," dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44.
Final Office Action dated Aug. 10, 2017, for U.S. Appl. No. 14/160,490, of Moring, D., et al., filed Jan. 21, 2014.
Final Office Action dated Sep. 15, 2017, for U.S. Appl. No. 14/182,655, of Spindel, N., et al., filed Feb. 18, 2014.
Examination Report No. 2 for Australian Patent Application No. 2014302661, dated Sep. 26, 2017.
Advisory Action dated Oct. 31, 2017, for U.S. Appl. No. 14/160,490, of Moring, D., et al., filed Jan. 21, 2014.
Examiner Requisition for Canadian Patent Application No. 2,916,603, dated Feb. 9, 2017.
"Another eBay Band-Aid Fails to Fix the New Pricing Structure Flaws," posted on Oct. 18, 2008, Retrieved from the Internet URL: https://thebrewsnews.wordpress.com/2008/10/18/another-ebay-band-aid-fails-to-fix-the-new-pricing-structure-flaws/, pp. 1-4.
"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.
"Merchantindustry.com—Best Merchant Services," Retrieved from internet URL: https://web.archive.org/web/20121020212419/http://www.merchantindustry.com/, on Dec. 30, 2015, pp. 1-7.
"Online Shopping," dated Nov. 2, 2014, Retrieved from the Internet URL: http://en.wikipedia.org/wiki/Online_shopping, on Nov. 10, 2014, pp. 1-12.
"Payment Gateway," Wikipedia, published May 30, 2014, Retrieved from the Internet URL: http://en.wikipedia.org/wiki/Pavment gateways, on Jun. 6, 2014, pp. 1-3.
"ProPay JAK Mobile Card Reader," Propay, published Dec. 27, 2011, Retrieved from the Internet URL: https://web.archive.org/web/20111227055421/https://www.propay.com/products-services/accept-payments/jak-card-reader, pp. 1-2.
"Tracking Inventory," PayPal, dated Jan. 4, 2010, Retrieved from the Internet URL: https://www.paypal-commmunity.com/t5/How-to-use-PayPal-ArchiverTracking-inventory/td-p/19392, pp. 1-3.
"Verified by Visa Acquirer and Merchant Implementation Guide," U.S. Region, Visa Public, May, 2011, pp. 1-114.
Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.
Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.
Punch, L., "E-commerce: Just what does card-present mean these days," dated Oct. 1, 2012, Retrieved from the Internet URL: http://digitaltransactions.net/news/ story/ E-Commerce_-Just-What-Does-Card-Present-Mean-These-Days, on Feb. 17, 2015, pp. 1-4.
Shalmanese, "The Straight Dope Message Board," message dated Oct. 5, 2013, Retrieved from the Internet URL: http://boards.straightdope.com/sdmb/showthread.php?t=703989%BB, on Jul. 18, 2016, pp. 1-10.
Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.
Non-Final Office Action dated Apr. 10, 2014, for U.S. Appl. No. 14/160,490, of Moring, D., et al., filed Jan. 21, 2014.
Non-Final Office Action dated May 29, 2014, for U.S. Appl. No. 13/837,562, of Chin, H.C.A., et al., filed Mar. 15, 2013.
Non-Final Office Action dated Aug. 27, 2014, for U.S. Appl. No. 14/165,256, of Aaron, P., filed Jan. 27, 2014.
Final Office Action dated Aug. 28, 2014, for U.S. Appl. No. 14/160,490, of Moring, D., et al., filed Jan. 21, 2014.
Advisory Action dated Nov. 18, 2014, for U.S. Appl. No. 14/160,490, of Moring, D., et al., filed Jan. 21, 2014.
Non-Final Office Action dated Dec. 1, 2014, for U.S. Appl. No. 14/062,617, of Templeton, T., et al., filed Oct. 24, 2013.
Final Office Action dated Jan. 26, 2015, for U.S. Appl. No. 13/837,562, of Chin, H.C.A. et al., filed Mar. 15, 2013.
Notice of Allowance dated Feb. 20, 2015, for U.S. Appl. No. 14/513,076, of Borovsky, A., et al., filed Oct. 13, 2014.
Final Office Action dated Mar. 17, 2015, for U.S. Appl. No. 14/165,256, of Aaron, P., filed Jan. 27, 2014.
Non-Final Office Action dated Mar. 19, 2015, for U.S. Appl. No. 14/329,638, of Aaron, P., et al., filed Jul. 11, 2014.
Final Office Action dated Apr. 16, 2015, for U.S. Appl. No. 14/062,617, of Templeton, T., et al., filed Oct. 24, 2013.
Non-Final Office Action dated May 20, 2015, for U.S. Appl. No. 13/829,080, of Morgan, T.B., et al., filed Mar. 14, 2013.
Non-Final Office Action dated Jun. 11, 2015, for U.S. Appl. No. 14/692,655, of Borovsky, A., et al., filed Apr. 21, 2015.
Final Office Action dated Sep. 17, 2015, for U.S. Appl. No. 13/829,080, of Morgan, T.B., et al., filed Mar. 14, 2013.
Non-Final Office Action dated Oct. 5, 2015, for U.S. Appl. No. 13/829,658, of Morgan, T.B., et al., filed Mar. 14, 2013.
Non-Final Office Action dated Oct. 6, 2015, for U.S. Appl. No. 14/329,658, of Aaron, P., et al. filed Jul. 11, 2014.
Non-Final Office Action dated Oct. 8, 2015, for U.S. Appl. No. 14/165,256, of Aaron, P., filed Jan. 27, 2014.
Final Office Action dated Oct. 16, 2015, for U.S. Appl. No. 14/692,655, of Borovsky, A., et al., filed Apr. 21, 2015.
Final Office Action dated Oct. 21, 2015, for U.S. Appl. No. 14/329,638, of Aaron, P., et al. filed Jul. 11, 2014.
Non-Final Office Action dated Nov. 18, 2015, for U.S. Appl. No. 14/182,655, of Spindel, N., et al., filed Feb. 18, 2014.
Advisory Action dated Nov. 24, 2015, for U.S. Appl. No. 13/829,080, of Morgan, T.B., et al., filed Mar. 14, 2013.
Advisory Action dated Dec. 30, 2015, for U.S. Appl. No. 14/692,655, of Borovsky, A., et al., filed Apr. 21, 2015.
Non-Final Office Action dated Feb. 2, 2016, for U.S. Appl. No. 13/829,080, of Morgan, T.B., et al., filed Mar. 14, 2013.
Non-Final Office Action dated Feb. 23, 2016, for U.S. Appl. No. 14/062,617, of Templeton, T., et al., filed Oct. 24, 2013.
Non-Final Office Action dated Mar. 14, 2016, for U.S. Appl. No. 14/692,655, of Borovsky, A., et al., filed Apr. 21, 2015.
Final Office Action dated Apr. 13, 2016, for U.S. Appl. No. 14/165,256, of Aaron, P., filed Jan. 27, 2014.
Final Office Action dated Apr. 27, 2016, for U.S. Appl. No. 14/182,655, of Spindel, N., et al., filed Feb. 18, 2014.
Non-Final Office Action dated May 3, 2016, for U.S. Appl. No. 13/830,350, of Morgan, T.B., et al., filed Mar. 14, 2013.

(56) References Cited

OTHER PUBLICATIONS

Final Office Action dated May 20, 2016, for U.S. Appl. No. 14/329,658, of Aaron, P., et al., filed Jul. 11, 2014.
Non-Final Office Action dated Jun. 7, 2016, for U.S. Appl. No. 14/088,113, of Maxwell, D.W., et al., filed Nov. 22, 2013.
Non-Final Office Action dated Jun. 8, 2016, for U.S. Appl. No. 14/088,141, of Maxwell, D.W., et al., filed Nov. 22, 2013.
Final Office Action dated Jun. 20, 2016, for U.S. Appl. No. 13/829,658, of Morgan, T.B., et al., filed Mar. 14, 2013.
Non-Final Office Action dated Jul. 14, 2016, for U.S. Appl. No. 14/160,490, of Moring, D., et al., filed Jan. 21, 2014.
Non-Final Office Action dated Jul. 21, 2016, for U.S. Appl. No. 14/329,638, of Aaron, P., et al., filed Jul. 11, 2014.
Final Office Action dated Sep. 1, 2016, for U.S. Appl. No. 14/062,617, of Templeton, T., et al., filed Oct. 24, 2013.
Notice of Allowance dated Sep. 13, 2016, for U.S. Appl. No. 14/692,655, of Borovsky, A., et al., filed Apr. 21, 2015.
Advisory Action dated Sep. 21, 2016, for U.S. Appl. No. 13/829,658, of Morgan, T.B., et al., filed Mar. 14, 2013.
Final Office Action dated Nov. 17, 2017, for U.S. Appl. No. 14/730,860, of Sasmaz, Y., et al., filed Jun. 4, 2015.
Notice of Allowance dated Nov. 24, 2017, for U.S. Appl. No. 13/829,658, of Morgan, T.B., et al., filed Mar. 14, 2013.
Non-Final Office Action dated Dec. 29, 2017, for U.S. Appl. No. 14/165,256, of Aaron, P., filed Jan. 27, 2014.
Examiner's Requisition for Canadian Patent Application No. 2,930,186, dated Jan. 11, 2018.
Final Office Action dated Jan. 22, 2018, for U.S. Appl. No. 13/830,350, of Morgan, T.B., et al., filed Mar. 14, 2013.
Examiner's Requisition for Canadian Patent Application No. 2,916,603, dated Feb. 15, 2018.

\* cited by examiner

INTEGRATED ONLINE AND OFFLINE INVENTORY MANAGEMENT

CROSS REFERENCE TO RELATED APPLICATIONS

This application is a non-provisional of and claims priority to U.S. Provisional Patent Application No. 61/839,098, filed on Jun. 25, 2013, the entire contents of which are hereby incorporated by reference.

TECHNICAL FIELD

This disclosure relates to systems for managing sales of goods or services.

BACKGROUND

A merchant operating a brick-and-mortar store can service customers using a point of sale (POS) system. The POS system can include a physical electronic cash register or dedicated POS hardware. When customers purchase items from the store, the merchant uses the POS system to record and complete the transaction. The POS system can also manage inventory for the store, e.g., track quantities of items for sale.

In a conventional POS electronic credit card transaction, the transaction is authorized and captured over a network connection. In an authorization stage, a physical credit card with a magnetic stripe is swiped through a merchant's magnetic card reader of a POS device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In a capture stage, the approved transaction is again routed from the merchant to the credit card processor, card network and card issuer, and the payment request can include the cardholder's signature (if appropriate). The capture stage can trigger the financial transaction between the card issuer and the merchant, and optionally creates a receipt. There can also be other entities, e.g., the card acquirer, in the route of the transaction. Debit card transactions have a different routing, but also require swiping of the card.

Occasionally, the merchant chooses to operate an online ecommerce store in addition to the brick-and-mortar store. The merchant can create an e-commerce web site and manually enter inventory data from the brick-and-mortar store. The merchant can program the web site to process online payment transactions.

BRIEF DESCRIPTION OF THE DRAWINGS

Like reference numbers and designations in the various drawings indicate like elements.

DETAILED DESCRIPTION

Figure 1:
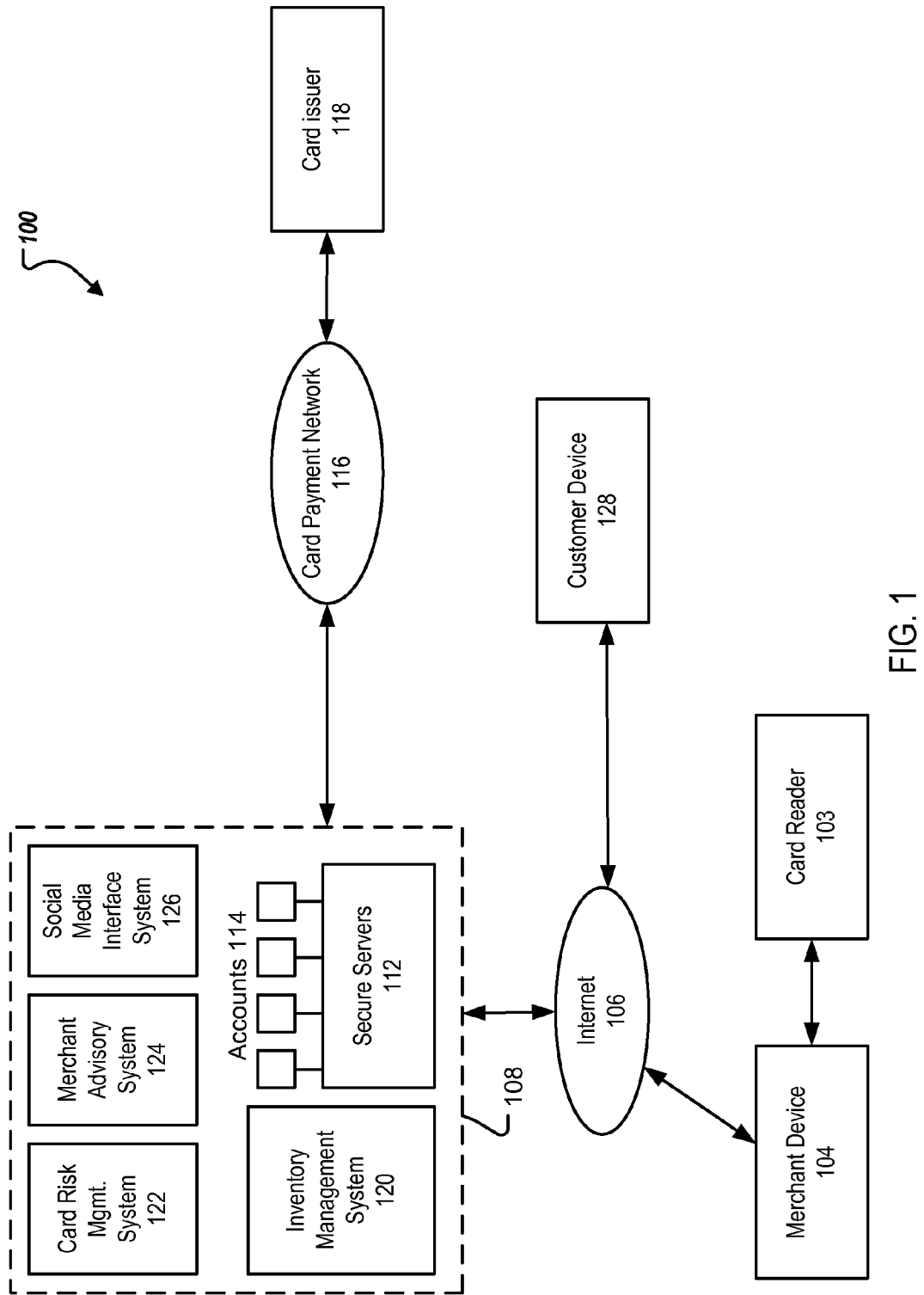
FIG. 1 is a schematic illustration of an example payment system architecture of a point of sale system.

A system manages both offline and online transactions and inventory in an integrated environment. An offline transaction is a sale at a point of sale (POS) system, e.g., at a typical "brick and mortar shop" physical store. An online transaction is a sale using an online store, e.g., an online shopping cart and checkout system accessed by a web browser or other application. An online store can be converted to offline store, and vice versa. An inventory management system can receive an input from a merchant device of merchant designating an item carried by the merchant as an item to be sold at the physical store, at the online store, or both. The inventory management system can modify a record of the item to respond to the input.

The system can analyze sales data to provide dynamic intelligent setup of online store based on offline product catalog, e.g., suggesting which items should be online or offline. The system can determine whether a card used for online purchases was verified by an offline swipe for improved security or risk calculation. The system can automatically parse submissions to social media sites to determine keywords indicating intent to sell and upon the determination, generate links to online store or payment systems.

An inventory management system can provide centralized inventory management between an online store and an offline physical store. For example, an item can be designated for sale offline only, online only, and both online and offline. The inventory management system can make each designation in response to an input received from a computer operated by a merchant, e.g., a merchant device located in a physical store. Likewise, the inventory management system can apply discounts provided for items sold at an online store to show up at a merchant device located at a physical store, if those items are designated to be available both offline and online. The inventory management system can propagate changes to an attribute at the physical store, e.g., changes to description, pricing, or quantity available, to the online store, and vice versa.

A card risk management system uses data of past transactions to expedite subsequent transactions. The data of past transactions can include records of past authorization, at a physical store, a purchase transaction by a buyer using a purchase card. The card risk management system records information on the purchase card and a user name, as provided by the user at the physical store, for authorizing the purchase transaction. A subsequent transaction can be an online transaction, by an online user having an online user account. The card risk management system can match the user name and the online user account in a unified authorization data store. If the match is successful, and upon determining that a purchase card used in the online transaction is the same as used in the physical store, the card risk management system can expedite authorization of the online purchase, e.g., by designating the online purchase as a low-risk transaction.

Likewise, the data of past transactions can include records of past authorization, at an online store, a purchase transaction by a buyer using a purchase card. A subsequent transaction can be an offline purchase transaction, by customer who visits a physical store. The card risk management system can expedite authorization of the offline purchase transaction in which the purchase card is used, using the records of past authorization of the online transactions.

A social media interface system mirrors an online or offline storefront of a merchant to an account of the merchant on a social media site. The system receives a copy of an electronic message from a user device of the merchant. The electric message can be a notification for changing an inventory of the merchant, changing a price of an item carried by the merchant, or a post on the social media site by the merchant. The system parses the copy of the message and determines that the message is related to the item and related to an online store or physical store of the merchant. The system then inserts a tag into the copy of the message, the tag linking the message to an online storefront of the online store or an offline storefront of the physical store. The system posts the copy of the message, including the tag, in the account of the merchant on a social media site.

Advantages may include one or more of the following. A merchant can create an online storefront based on existing inventory data with a single action. The online storefront can provide a complete checkout process for each item in the inventory data. The merchant can sell to online customers as well as customers in the physical store, which can create a new revenue stream. Inventory data can be synchronized across both the online storefront and the brick-and-mortar store. The merchant does not have to separately maintain inventory data for the online storefront and the brick-and-mortar store.

FIG. 1 is a schematic illustration of the architecture of an example point of sale system 100. The overall system 100 includes a merchant device 104, e.g., a computing device configured to perform point of sale functions, connected to network 106, e.g., the Internet. The computing device can be a mobile computing device, e.g., a hand-held computing device, capable of executing a customer or a merchant application. For example, the computing device can be a smartphone, tablet, a desktop computer, a laptop computer, dedicated point of sale hardware, or other data processing apparatus.

A payment processor operates a payment service system 108. The payment processor processes transactions conducted at the merchant device 104. The merchant device 104 can receive card information, e.g., through a card swipe, for the transaction at a card reader 103. The merchant device 104 communicates with the payment service system 108 using the network 106. The payment service system 108 includes one or more servers 112, at least some of which are secure servers configured to handle secure transactions, including process transactions with the merchant device 104. In general, servers 112 can store public merchant information such as the merchant's address or phone number. The servers 112 also handle secure information such as credit card numbers, debit card numbers, bank accounts, user accounts, user identifying information or other sensitive information.

The payment service system 108 can communicate with a computer system 116 of a card payment network, e.g., Visa or MasterCard. The payment service system 108 can communicate with a computer system 116 over the same network 106 used to communicate with the merchant device 104, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

To receive funds from the transaction, the merchant can enter financial account information into the payment service system sufficient to receive funds. For example, in the case of a bank account, the merchant can enter a bank account number and routing number. The merchant's financial account can also be associated with a credit card account or another third party financial account. In addition, in some implementations, if the merchant has not entered the financial account information, the payment service system 108 can cause the received funds to be withheld until the financial account information is provided.

Although FIG. 1 describes communicating with a card payment network using a payment card, the customer and the merchant can conduct a transaction using another form of payment, e.g., automated clearing house (ACH) payments, gift cards, loyalty purchases, or other payment mechanisms from a third party.

The payment service system 108 can include an inventory management system 120. The inventory management system 120 can include one or more computers configured to manage items for sale by the merchant, e.g., using one or more databases. For example, the inventory management system 120 can store detail descriptions for each item. The detail descriptions can include a title, a price, a picture, quantity, a category, or a description of the item. In some implementations, the inventory management system 120 stores whether the item is available in store only, online only, or both. The inventory management system 120 can also store whether a single item is available for sale, or multiple items (in some implementations, this indication is stored as a separate variable from a quantity of inventory for the item). Therefore, the payment service system 108 can not only process financial transactions but can also manage inventory data for the merchant.

Through the inventory management system 120, the merchant can add, remove, or modify the inventory data. The merchant can use merchant device 104 or another device, e.g., a desktop device connected to the inventory management system 120. For example, the merchant can execute a merchant application on the merchant's device. The merchant can add an item to the inventory data through an interface of the merchant application. The merchant application can send the added item to the inventory management system 120, which stores the added item in one or more databases. In some other implementations, the merchant accesses, e.g., using a desktop computer, a web site that is hosted by the payment service system 108 and the merchant manages the inventory data through the web site.

The payment service system 108 can include a card risk management system 122, a merchant advisory system 124, and a social media interface system 126. Card risk management system 122 can implement online and offline cross authentication to improve credit card security. Merchant advisory system 124 can use online and offline sales data to provide marketing recommendations to a merchant. Social media interface system 126 can help a merchant or a non-merchant user to promote an item over social media, e.g., a social networking site, a microblog, a message forum, or the like. The architecture and operations of the card risk management system 122, merchant advisory system 124, and social media interface system 126 are described in additional details below in reference to FIGS. 3-11.

The system 100 can also include a customer device 128. The customer device 128 can interface with the payment service system 108 through the network 106. The customer device 128 can be a mobile device, a desktop device, or other data processing apparatus. For example, the customer device 128 can be used by a customer at home to make an online purchase using the payment service system 108.

Figure 2A:
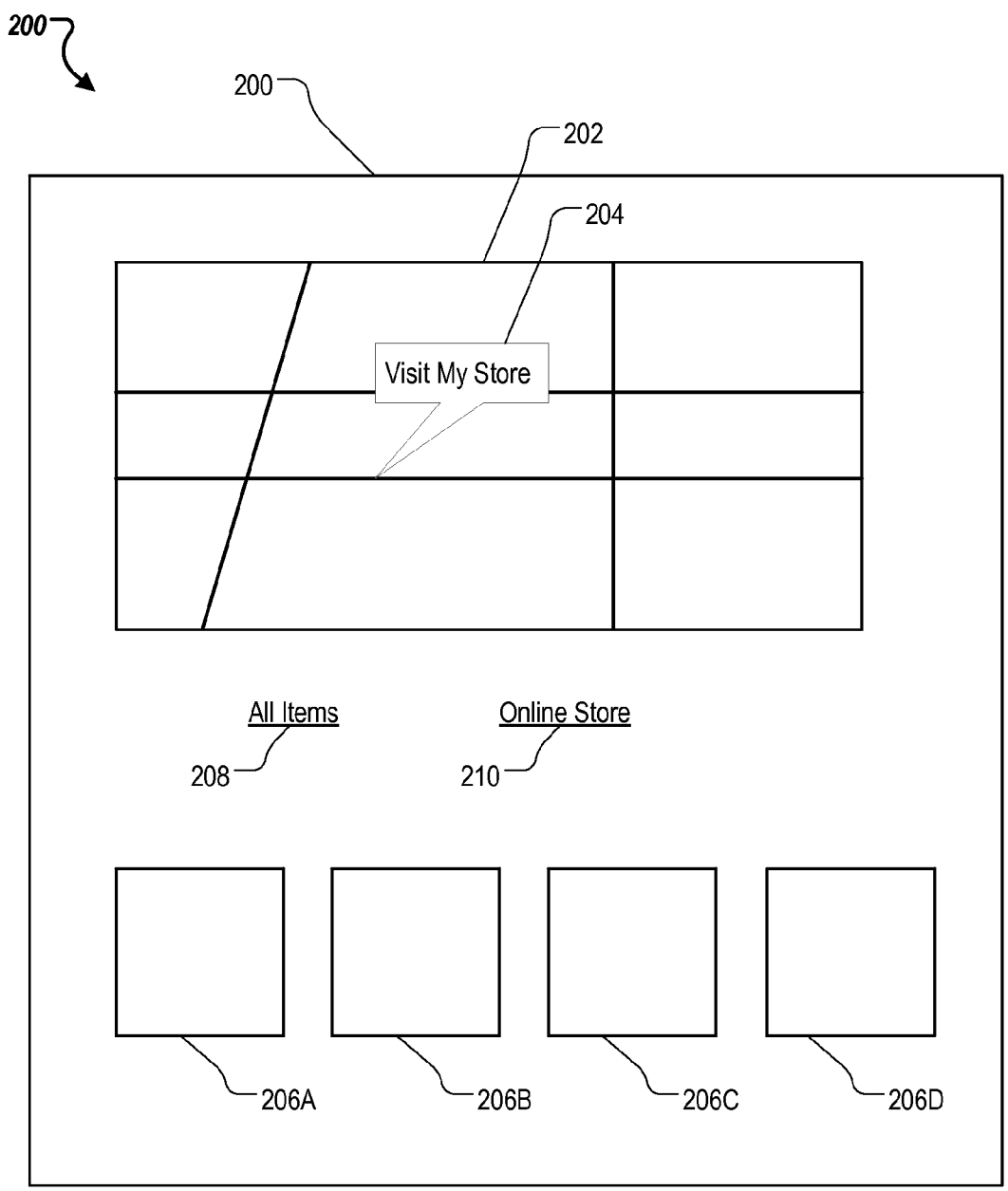
FIGS. 2A and 2B are schematic illustrations of example user interfaces for managing online and offline inventory.

FIG. 2A is a schematic illustration of an example user interface 200 for generating an online storefront. A merchant can use the user interface 200 to convert an offline store to an online store, and vice versa. Inventory management system 120 can provide user interface 200 for display in a web browser. Using input received through user interface 200, inventory management system 120 can manage online inventory and offline inventory of a merchant in an integrated environment. The online inventory can be a group of items that the merchant lists for sale in an online store where people can by the items using online transactions. The offline inventory can be a group of items that the merchant sells in a physical store.

Inventory management system 120 can display virtual map 202 in user interface 200. Virtual map 202 can be a map of a geographic area in which the physical store of the merchant is located. Inventory management system 120 can determine the area based on a location of the physical store, which can be stored by inventory management system 120 when the merchant registers the physical store with the inventory management system 120 and enters the address of the physical store. Inventory management system 120 can display marker 204 in virtual map 202. Marker 204 can be placed at a location on virtual map 202 that corresponds to the address of the physical store.

Inventory management system 120 can display item representations 206A, 206B, 206C, and 206D in user interface 200. Each of item representations 206A, 206B, 206C, and 206D can represent an item that the merchant lists for sale. Each of item representations 206A, 206B, 206C, and 206D can include, or be associated with, an item name, an item picture, an item price, or any combination of the above. Inventory management system 120 can generate item representations 206A, 206B, 206C, and 206D automatically, based on sales data submitted by a merchant device located in a physical store of the merchant, based on data manually entered by the merchant, based on data of an online store of the merchant, or based on any combination of the above.

Inventory management system 120 can display item selections 208 and 210 in user interface 200. Item selection 208 can be a user interface item that, upon selection, causes inventory management system 120 to display both representations of items of the online inventory and representations of items of offline inventory of the merchant in user interface 200. Item selection 210 can be a user interface item that, upon selection, causes inventory management system 120 to display representations of items of offline inventory of the merchant in user interface 200, and hide representations of items of offline inventory of the merchant from display. Upon receiving a selection of one of item selection 208 or item selection 210, inventory management system 120 can display a user interface for designating an item as part of online inventory or offline inventory. The user interface displayed is described below in additional details in FIG. 2B.

Figure 2B:
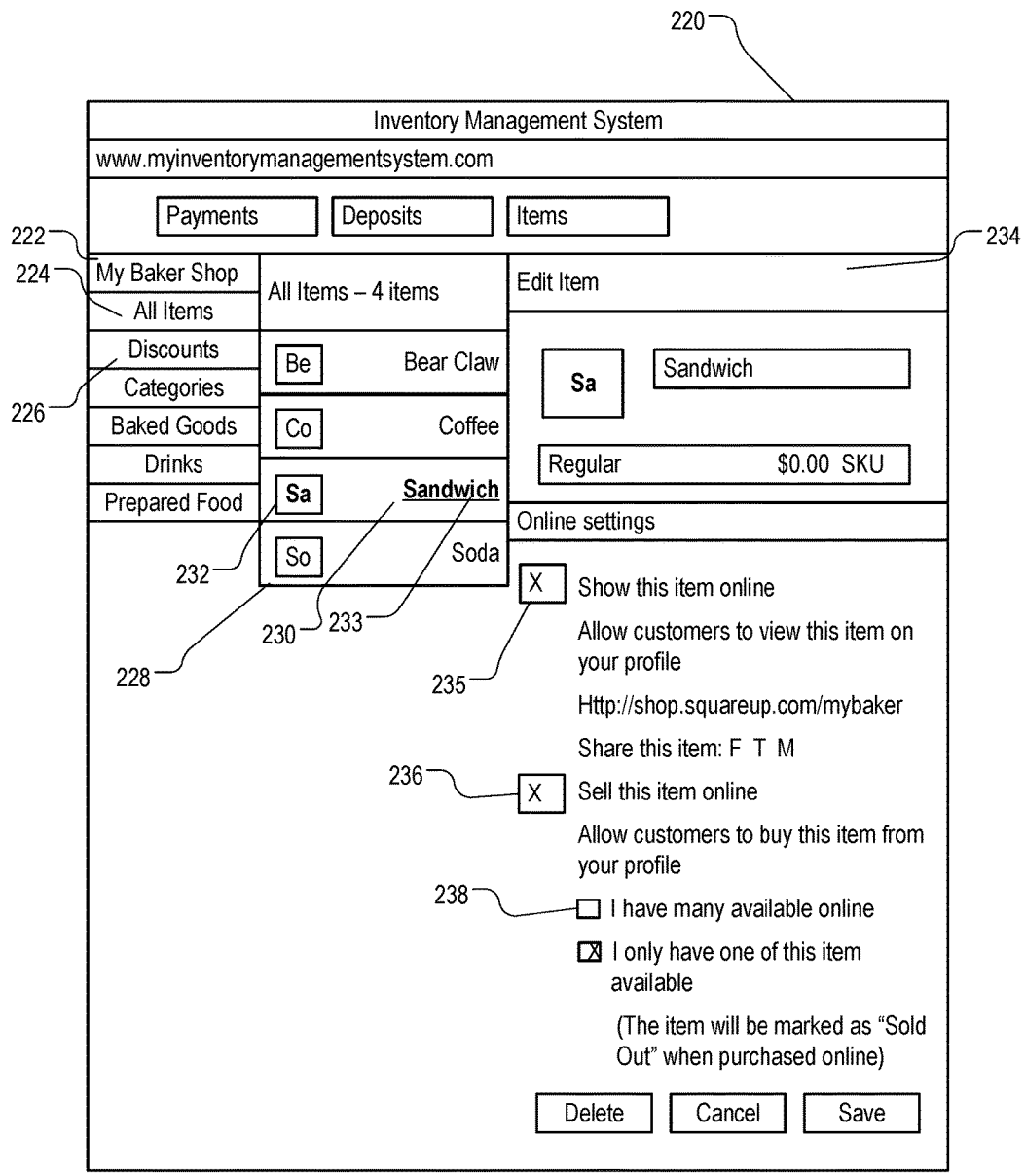

FIG. 2B is a schematic illustration of an example user interface 220 for designating an item as part of online inventory or offline inventory. Inventory management system 120 can provide user interface 220 for display in a web browser. User interface 220 can be an interface for managing online inventory and offline inventory in an integrated environment.

Inventory management system 120 can provide store name 222 for display in user interface 220. Store name 222 can correspond to a physical store name that is registered with inventory management system 120. Inventory management system 120 can provide inventory selectors 224 and 226 for display in user interface 220. Upon receiving a selection input through inventory selector 224 (as indicated by the underline in FIG. 2B), inventory management system 120 can display a list of items in both online inventory and offline inventory for display in user interface 220. Upon receiving a selection input through inventory selector 226, inventory management system 120 can display a partial list of the items for display. The partial list can be one of a list of items in only the online inventory, a list of items in only the offline inventory, or a list of some items (e.g., discount items) in both the online inventory and the offline inventory.

Inventory management system 120 can display a corresponding item list 228 upon receiving an input in one of inventory selectors 224 or 226. Item list 228, as shown in FIG. 2B, includes items from both the online inventory and the offline inventory. For example, item list 228 can include a representation 230 of an item. Representation 230 can include a merchant-supplied icon 232 of the item and a name or description 233 of the item collected from a merchant device.

Inventory management system 120 can receive a user selection of representation 230 from the item list 228, for example, a click on representation 230. Upon receiving the selection, inventory management system 120 can provide details of the item represented by representation 230 for display in item edit area 234. Item edit area 234 can include editing interfaces for changing the item's icon, name, price, stock keeping unit (SKU), availability status, and other attributes. Inventory management system 120 can pre-populate the name, price, and SKU based on data received from a merchant device in a physical store.

Inventory management system 120 can display a one-click listing selection 235, e.g., a check box or radio button. Upon receiving an input through one-click listing selection 235 to show the item in a merchant's online profile, inventory management system 120 can display the item in the a merchant's profile to a user viewing the profile. Upon receiving an input through one-click listing selection 235 not to show the item in a merchant's online profile, inventory management system 120 can remove the item from display in the online profile.

Inventory management system 120 can display a one-click status selection 236, e.g., a checkbox or radio button, for designating the item as an online item or offline item. Upon receiving an input through one-click status selection 236 to designate the item as an online item, inventory management system 120 can display the item in an online store. Upon receiving an input through one-click status selection 236 to designate the item as an offline item, inventory management system 120 can remove the item from display in the online store.

Inventory management system 120 can provide for display item attribute interface 238. Based on input received from attribute interface 238, inventory management system 120 can specify the manner in which an online inventory is managed. For example, upon receiving an input from attribute interface 238 specifying that the merchant has only one item to sell, inventory management system 120 can mark the item in an online store as "sold out" upon receiving an indication from a merchant device that the only item has been sold in a physical store. Upon receiving an input from attribute interface 238 specifying that the merchant has multiple items to sell, the inventor management system can display a field for the merchant to input a quantity of the items that are available for sale. The inventory management system 120 can keep listing the item in the online store as available for sale.

Figure 3:
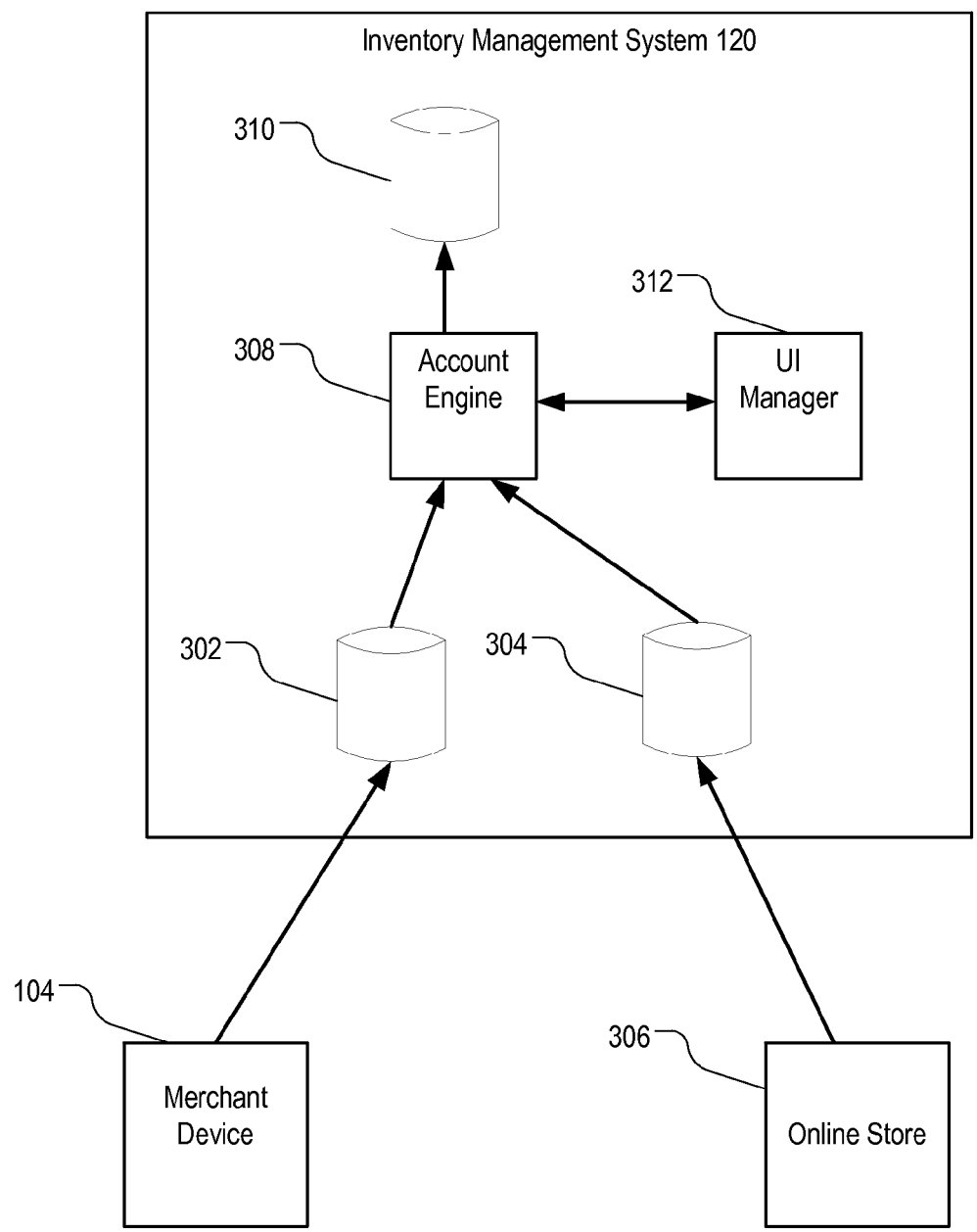
FIG. 3 is a block diagram illustrating an example architecture of an inventory management system.

FIG. 3 is a block diagram illustrating an example architecture of inventory management system 120. Inventory management system 120 can include hardware, software, and firmware components.

Inventory management system 120 can include offline inventory database 302. Offline inventory database 302 is a component of inventory management system 120 configured to receive data from merchant device 104 and process and store the data. The data received from merchant device 104 can include, for example, time, date, and location of a sale, a price of an item, an SKU of the item, a name or label of the item, a card number of a purchase card being used to buy the item, a name on the purchase card, a card type of the purchase card, an issuer name of the purchase card, and an expiration date of the purchase card.

Inventory management system 120 can include online inventory database 304. Online inventory database 304 is a component of inventory management system 120 configured to receive data from online store and process and store the data. The data received from online store 306 can include, for example, time, date, and location of a sale, a price of an item, an SKU of the item, a name or label of the item, a card number of a purchase card being used to buy the item, a name on the purchase card, a card type of the purchase card, an issuer name of the purchase card, an expiration date of the purchase card, a shipping address, a shipping method, a billing address, a shipping address, and a recipient name.

Inventory management system 120 can include account engine 308. Account engine 308 is a component of inventory management system 120 configured to associate data in data in offline inventory database 302 and online inventory database 304 to generate integrated inventory data. Account engine 308 can store the integrated inventory data in merchant data store 310. Merchant data store 310 is a component of inventory management system 120 configured to store the integrated inventory data, in association with a registered merchant who operates the physical store where merchant device 104 is located and who also operates online store 306. In the integrated inventory data, a representation of an item can be associated with a flag indicating whether the item is an online item or offline item or both.

Inventory management system 120 can include user interface manager 312. User interface manager 312 is a component of inventory management system 120 configured to generate user interfaces 200 and 220 for display, and to receive user input through the user interfaces. User interface manager 312 can interpret the user input and request account engine to change status of an item from an online item to an offline item or vice versa, for example, by toggling the flag associated with the item.

Inventory management system 120 can store an inventory of items for sale. The inventory is a list of items. The inventory includes a first item that is designated for sale only at a physical store where a buyer can visit personally. The first item can be, for example, represented in the user interface by representation 230, as illustrated in FIG. 2B. The inventory includes a second item that is designated for sale only at an online store 306 accessible by online buyers using a buyer application program or a web browser. The second item can be, for example, a to-go item not listed in item list 228.

Inventory manage system 120 can provide a first list of records of items in the inventory to merchant device 104 located at the physical store for display to a merchant at the physical store. The first list includes a record of the first item but either excludes a record of the second item or includes a record of the second item and an indicator that the second item is not for sale at the physical store.

Inventory management system 120 can provide a second list of records of items in the inventory to a server of the online store 306 for serving to the buyer application program or web browser. The second list includes a record of the second item but either excludes a record of the first item or includes a record of the first item and an indicator that the first item is not for sale at the online store 306.

Inventory management system 120 receives from the merchant device 104 a notification indicating that the merchant device 104 received an input from the merchant for offering the first item for view or for sale at the online store 306. The input can be received through one-click status selection 236 of FIG. 2B. In response to the notification, inventory management system 120 provides a new second list of records to the server of the online store 306. The new second list includes both the record of the first item and the record of the second item, and including an indicator that the first item is for view or for sale at the online store as specified in the notification from the merchant device.

In some implementations, the request can include an indicator that the input from the merchant device user specifies that an in-store discount at the physical store is applicable to the first item to the online buyers. In response, inventory management system 120 can associate the record of the first item in the new second list with the indicator of the in-store discount. In some implementations, the request can include an indicator that the input from the merchant device user specifies a quantity of first items available to the online buyers, e.g., an input received from attribute interface 238. In response, inventory management system 120 can associate the record of the first item in the new second list with the quantity.

Figure 4:
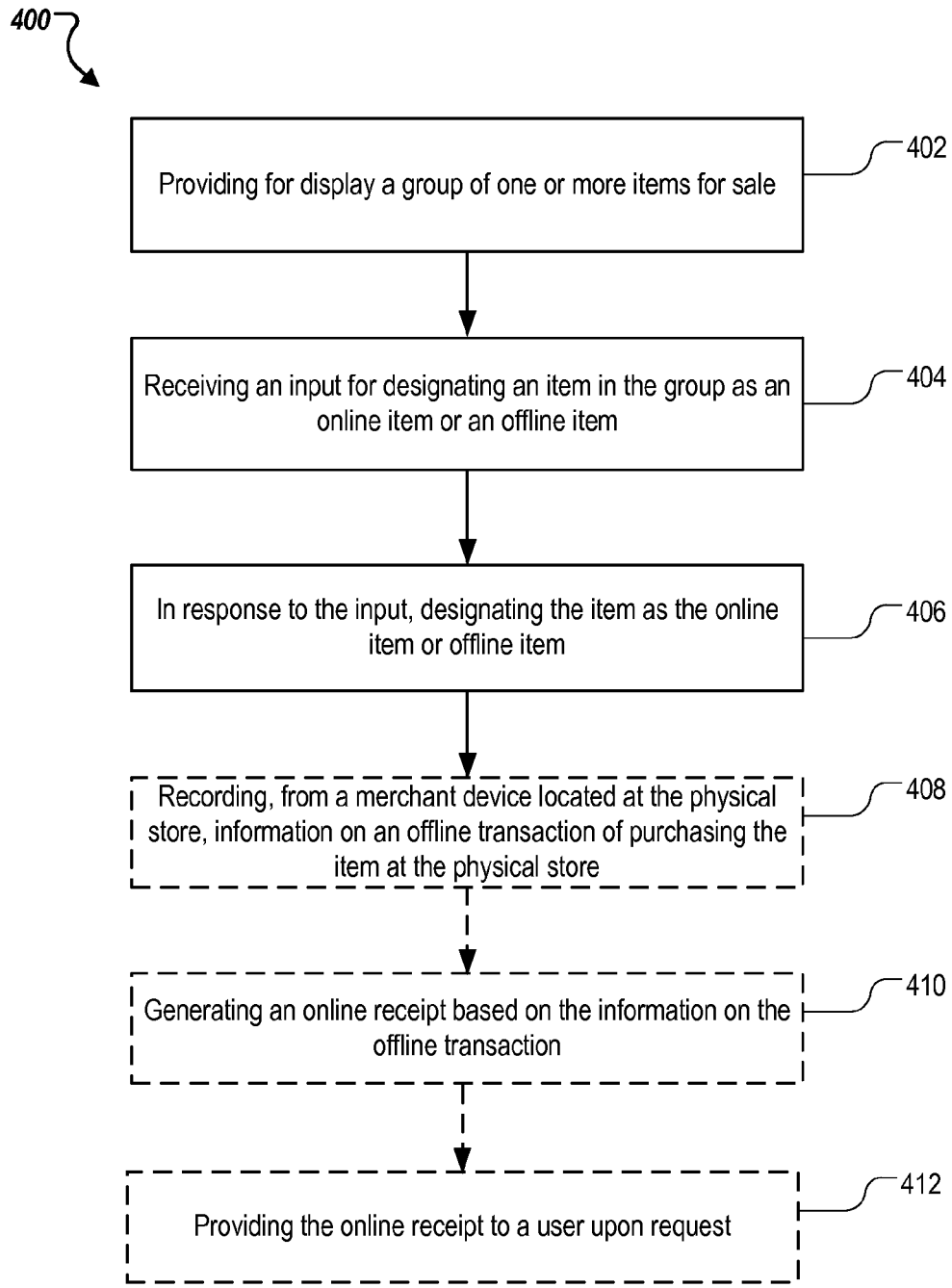
FIG. 4 is a flowchart of an example procedure of managing online and offline inventory.

FIG. 4 is a flowchart of example procedure 400 of managing online and offline inventory. Procedure 400 can be performed by inventory management system 120.

Inventory management system 120 can provide (402) for display a group of one or more items for sale, e.g., in item list 228 of user interface 220. Inventory management system 120 can determine the group of one or more items based on information received by the one or more computers from a merchant device located at the physical store. The group of one or more items can be displayed in a web browser. The input can include a user input selecting the item in the web browser and a user input for designating the item as the online item or the offline item.

Inventory management system 120 can receive (404) an input for designating an item in the group as an online item or an offline item. The online item can be an item for sale through an online store. The offline item can be an item for sale at a physical store.

In response to the input, inventory management system 120 can designate (406) the item as the online item or offline item. The designation operations can include at least one of removing the item from an online inventory and placing the item in an offline inventory, removing the item from the offline inventory and placing the item in the online inventory, or adding the item that is already in the offline inventory to the online inventory.

Optionally, inventory management system 120 can record (408) from a merchant device located at the physical store, information on an offline transaction of purchasing the item at the physical store. Inventory management system 120 can then generate (410) an online receipt based on the information on the offline transaction. The online receipt can include an electronic document specifying a time, a location, a price, and an item name of the transaction. Inventory management system 120 can provide (412) the online receipt to a user upon request.

In some implementations, inventory management system 120 receives a second input for sharing an attribute of the item between the online inventory and the offline inventory. In response, inventory management system 120 adds the attribute to a record of the item in the online inventory according to the attribute of the item in the offline inventory or adds the attribute to a record of the item in the off line inventory according to the attribute of the item in the online inventory. The attribute can include a discount status, discount amount, product description, product image, or quantity. In some implementations, attributes added to the record of the item in the online inventory is automatically added to the record of the item in the off line inventory, and vice-versa. In some implementations, changes to attributes in the record of an item in the online inventory is automatically propagated to the record of the item in the off line inventory, and vice-versa. Both the online inventory and the offline inventory are stored on inventory management system 120, which provides the online inventory to a server of the online store and provides the offline inventory to a merchant device located at the physical store.

Figure 5:
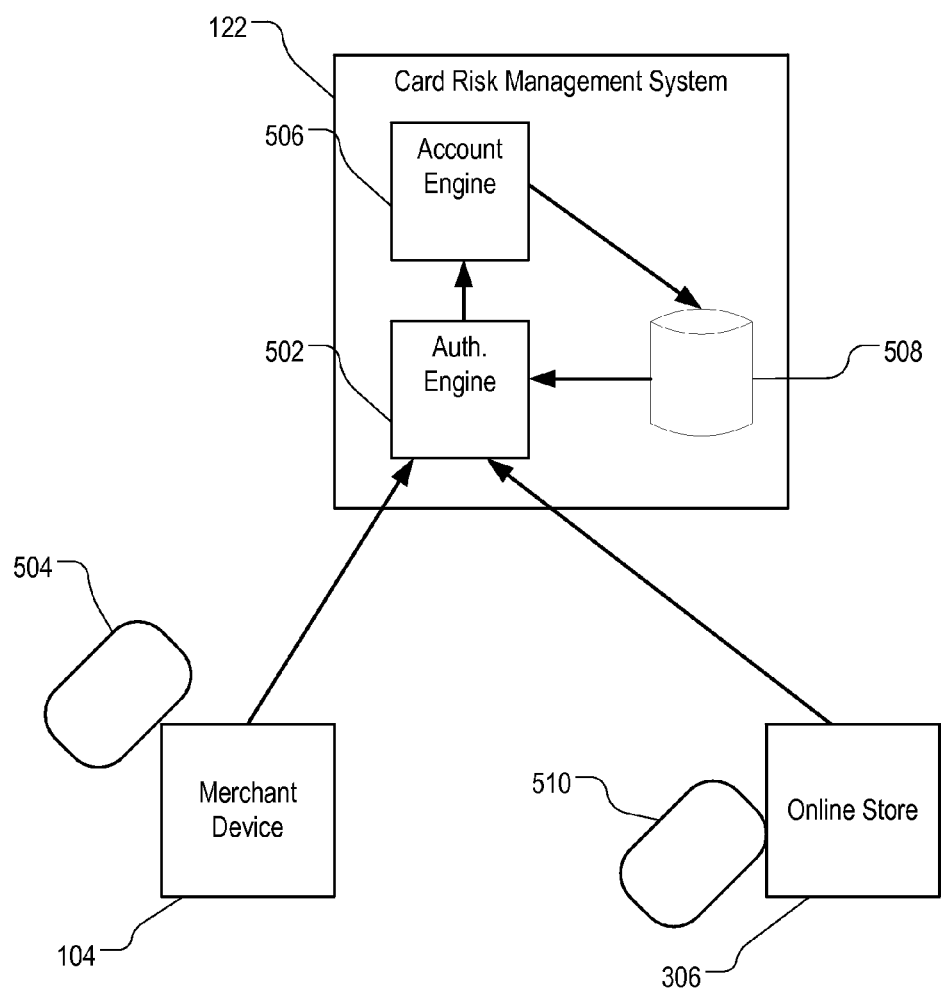
FIG. 5 is a block diagram illustrating an example architecture of a card risk management system.

FIG. 5 is a block diagram illustrating an example architecture of card risk management system 122. Card risk management system 122 can include hardware, software, and firmware components.

Card risk management system 122 can include authentication engine 502. Authentication engine 502 is a component of card risk management system 122 configured to receive purchase card information from merchant device 104. Merchant device 104 can provide the purchase card information upon receiving a card swipe or insertion of purchase card 504, e.g., through card reader 103 of FIG. 1. Upon determining that purchase card 504 is authenticated, authentication engine 502 can associate the purchase card information and user information, and provide the purchase card information and user information to account engine 506. The user information can include information of the user swiping purchase card 504 as collected by merchant device 104.

Account engine 506 is a component of card risk management system 122 configured to associate the purchase card information, the user information, an account of a user of the purchase card, and optionally, an account of the merchant operating a physical store where merchant device 104 is located. Account engine 506 can encrypt the associated data as integrated authentication data and store the integrated authentication data in authorization data store 508.

Authentication engine 502 can receive purchase card information from online store 306 when a user uses a purchase in a transaction in online store 306. Purchase card information from online store 306 can include card information of purchase card 510 and online user information as provided by the user. Authentication engine 502 can determine there is a match between purchase card 504 and purchase card 510. In response, authentication engine 502 can authenticate purchase card 510 based at least in part on the integrated authentication data in authorization data store 508. In some implementations, the match can be a match in card number. In some implementations, the match can be based on other criteria including, for example, user name, address, or security code, or a factor that a same merchant operates both the physical store where merchant device 104 is located and online store 306. In some implementations, authentication engine 502 can authenticate purchase card 510 based at least in part on the integrated authentication data even when the physical store where merchant device 104 is located and online store 306 are operated by different merchants. For example, whether the purchase card matches a card that was previously physically swiped through the card reader 103, can be used as a factor in a risk algorithm in the card risk management system 122 that determines whether to approve the transaction, e.g., by increasing the maximum limit for a transaction, or otherwise serving as a weighted factor.

In some implementations, authentication engine 502 can receive purchase card information from online store 306 before receiving purchase card information from merchant device 104. Authentication engine 502 can generate integrated authentication data in a similar manner. Upon receiving request to authenticate from merchant device 104, authentication engine 502 can authenticate purchase card 504 based at least in part on the integrated authentication data.

The card risk management system 122 can receive offline transaction information from a merchant device 104 located in a physical store personally visited by a buyer. The offline transaction information can include user information and purchase card information. The user information can associated with a store user name of the buyer stored at the card risk management system. The purchase card information can include a record R1 of purchase card 504 that the buyer used in a purchase transaction at the physical store. The record R1 can indicate that the purchase card 504 was authorized in the purchase transaction.

Subsequent to the purchase transaction, the card risk management system 122 can receive, from a server of an online store 306, a request to process an online transaction in which purchase card 510 is used. The request can include an online user name and a record R2 of the purchase card 510;

The card risk management system 122 can determining that, according to buyer information stored in a buyer database of the card risk management system 122, (1) the online user name is associated with the store user name, and that, (2) according to information in the first record and information in the second record, the purchase card 510 used in the online transaction is same as the purchase card 504 used in the physical store. The buyer database can be the authorization database 508 or another database the is part of, or coupled to, the card risk management system 122.

In response to determining (1) and (2) above, the card risk management system 122 can authorize the online transaction. In some implementations, card risk management system 122 can authorize the online transaction based at least in part on an indicator that the purchase card 504/510 was authenticated before at the physical store, and that a transaction using purchase card 504/510 was authorized. In some implementations, the card risk management system 122 can submit information of the online transaction to a service that issued the purchase card 504/510 for authorization. For example, the card risk management system 122 can transmit, to the service, the information in the record R2 in association with an indicator that the purchase card 510 was authenticated before at the physical store. The card risk management system 122 can notify the server of the online store 306 that the online transaction is allowed or denied.

Likewise, the authorization of a purchase using purchase card 510 can occur at the online store 306 first. The card risk management system 122 can expedite authorization of a subsequent purchase transaction at merchant device 104 using purchase 504.

Figure 6:
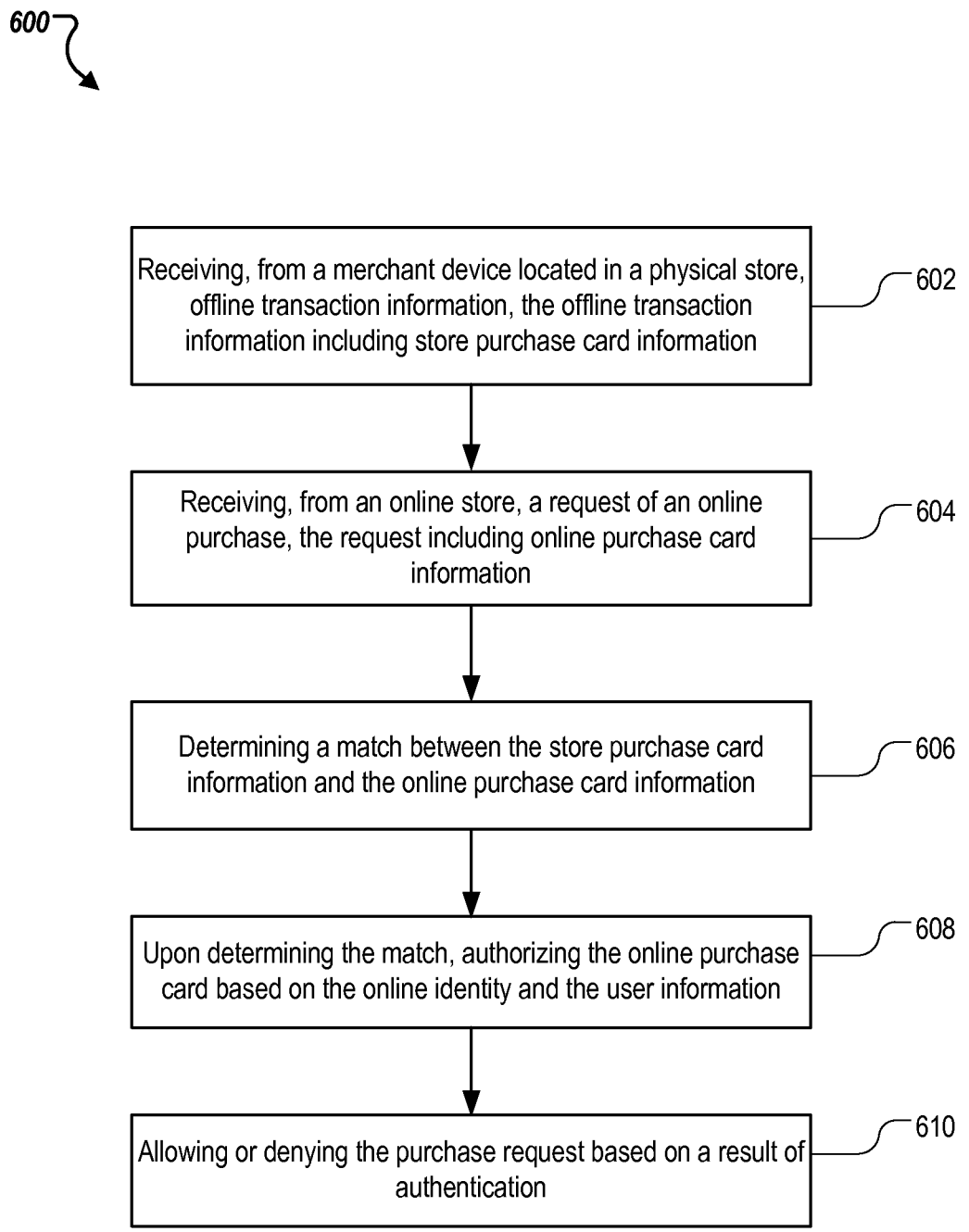
FIG. 6 is a flowchart of an example procedure of authorizing online transactions using point of sale data.

FIG. 6 is a flowchart of example procedure 600 of authorizing online transactions using point of sale data. A similar procedure can be used to authorizing point of sale transaction using online transaction data. Procedure 600 can be performed by card risk management system 122.

Card risk management system 122 can receive (602), from a merchant device located in a physical store operated by a merchant, offline transaction information. The offline transaction information can include store purchase card information and user information. The store purchase card can be, for example, a credit card, a debit card, a gift card, or a store card. The store purchase card information can include a first card number and a first expiration date. The user information can include at least one of a first user name, a first user address, or a first user signature.

Card risk management system 122 can receive (604), from an online store operated by the merchant who also operates the physical store, a request for authorizing an online purchase. The request can include online purchase card information. The online purchase request can be associated with an online identity of a user. The online purchase card can be, for example, a credit card, a debit card, a gift card, or a store card. The online purchase card information includes a second card number and a second expiration date. The online identity can include at least one of a second user name, a second user address, or a second user signature.

Card risk management system 122 can determine (606) a match between the store purchase card information and the online purchase card information. In some implementations, determining the match between the store purchase card information and the online purchase card information can include determining that the first card number and first expiration date match the second card number and second expiration date, respectively. In some implementations, determining the match between the store purchase card information and the online purchase card information can include determining that, according to an online registry, the first card number and second card number are associated with a same user or same account Upon determining the match, card risk management system 122 can authorize (608) the online purchase card for use in the online purchase based on the online identity and the user information. Authorizing the online purchase card can include authorizing the online purchase by card risk management system 122 based on past authorization. Authorizing the online purchase card can include submitting, card risk management system 122, and online transaction information to a card authorization service in association with an indication that the transaction is a low risk transaction.

Card risk management system 122 can allow or deny (610) the online purchase request based on a result of authentication. Card risk management system 122 can allow the online purchase upon successful authentication. Card risk management system 122 can deny the online purchase upon failed authentication.

In some implementations, procedure 600 can be performed by a system including a merchant computer in a physical store of a merchant, an online store server, a transaction processing server, and an authorization server located remotely from one another. The merchant computer can have a card reader, and is programmed to generate offline transaction information for an offline transaction with a customer, and to receive first purchase card information from the card reader.

The online store server can provide an online store for the merchant to a customer device. The transaction processing server can receive the offline transaction information including the first purchase card information from the merchant computer. The transaction processing server can store the first purchase card information. The transaction processing server can receive from the online store server a request for authorizing an online purchase. The request can include online purchase card information including second purchase card information. The transaction processing server can determine a match between the first purchase card information and the second purchase card information.

The authorization computer of a financial institution that issued the card can receive from the transaction processing server the online purchase card information and an indication of a match between the first purchase card information and the second purchase card information, and to allow or deny the online purchase based at least in part of the indication of the match.

Figure 7:
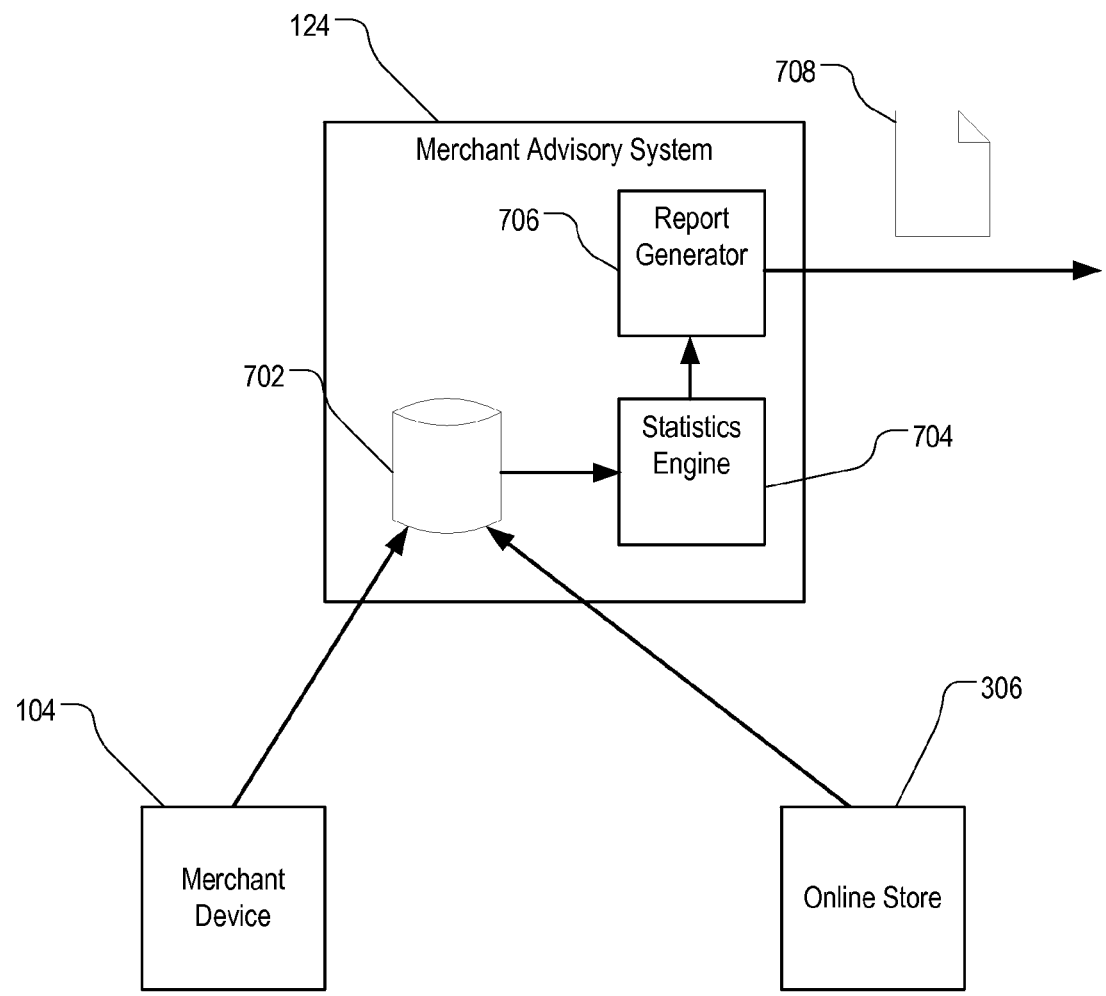
FIG. 7 is block diagram illustrating an example architecture of a merchant advisory system.

FIG. 7 is block diagram illustrating an example architecture of a merchant advisory system 124. Merchant advisory system 124 can include hardware, software, and firmware components.

Merchant advisory system 124 can include transaction database 702. Transaction database 702 is a component of merchant advisory system 124 configured to receive and store transaction data from merchant device 104 that is located in a physical store, and transaction data from online store 306. The transaction data can include time and geographical or virtual location of each purchase or return. In some implementations, transaction data from multiple merchants can be aggregated.

Merchant advisory system 124 can include statistics engine 704. Statistics engine 704 is a component of merchant advisory system 124 configured to analyze the transaction data stored in transaction database 702 and determine a time and location based probability on which item is more likely to be sold when and where, including whether the item is more likely to be sold online or in a physical store located at a given geographic location. Statistics engine 704 can generate a statistic model for items recorded in the transaction data. In some implementations, merchant advisory system 124 can automatically apply the statistic model to items in an inventory of merchant data store 310 (of FIG. 3) and designate an item to be listed online or offline based on the statistic model. The statistic model can include time and location based probability density of each item being purchased or returned over an hourly, a daily, a weekly, a monthly, a quarterly, or an annual period.

Merchant advisory system 124 can include report generator 706. Report generator 706 is a component of merchant advisory system 124 configured to receive a request from a merchant for marketing recommendations. Based on the statistic model generated by statistics engine 704, report generator 706 can generate recommendation 708 in response to the request. Recommendation 708 can include a portion of the statistic model determined based on a time and location as specified in the request and formatted to a human-readable format. Recommendation 708 can include a suggestion on whether, at a given time, an item shall be listed online or offline. Recommendation 708 can include a suggestion on whether at a given time, an advertisement, a discount, or a rebate on a particular item shall be published online or at a physical store. The recommendation can be based on statistics showing, for example, on a given day of week, sales of a particular item at a particular physical store or online is higher (or lower) than other days by a threshold amount. Report generator 706 can provide recommendation 708 for display in a browser.

Figure 8:
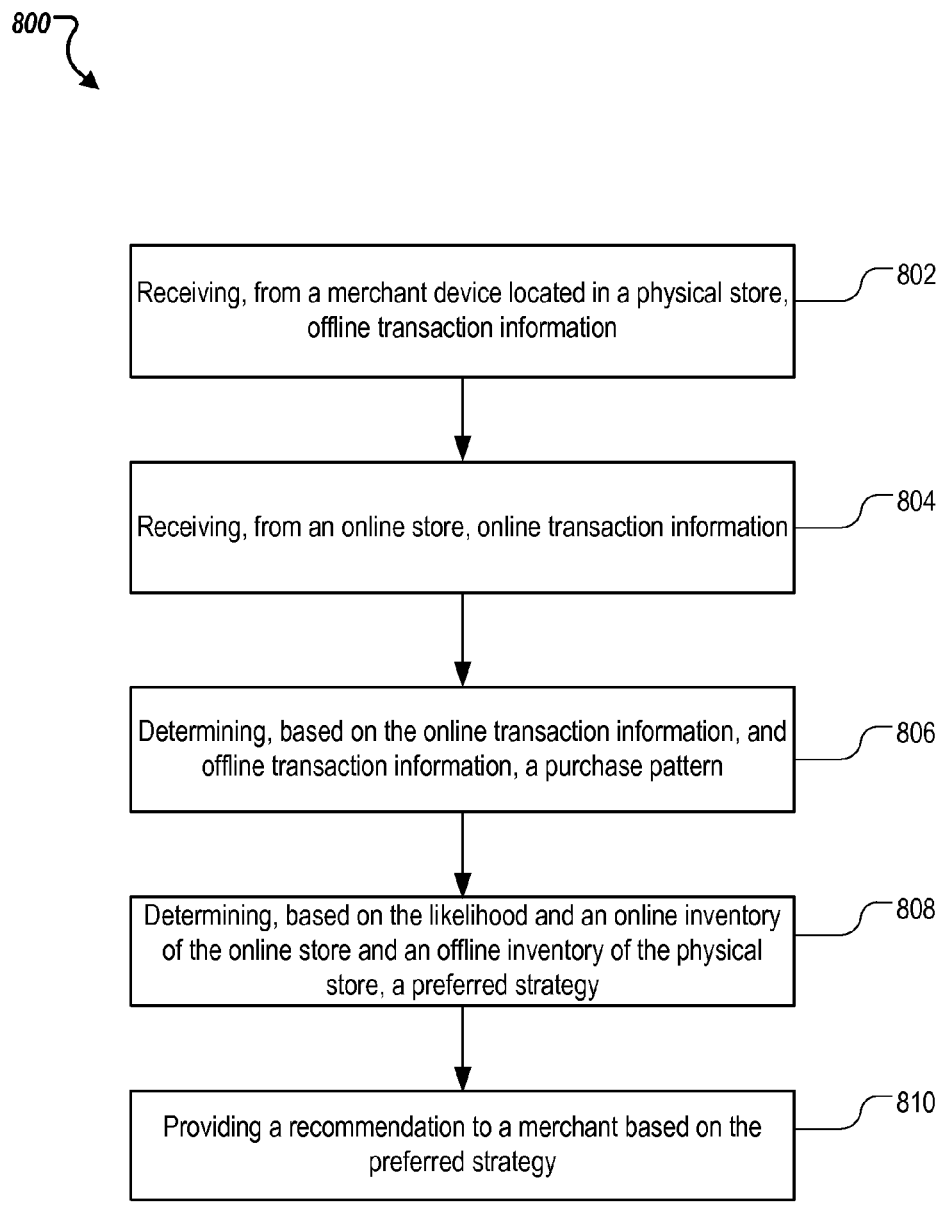
FIG. 8 is a flowchart of an example procedure of providing recommendations to online stores using point of sale data.

FIG. 8 is a flowchart of example procedure 800 of providing recommendations to online stores using point of sale data. Procedure 800 can be performed by merchant advisory system 124.

Merchant advisory system 124 can receive (802), from a merchant device located in a physical store, offline transaction information. The offline transaction information can include a history of purchases or returns that occurred at the physical store and a timestamp associated with each purchase and return.

Merchant advisory system 124 can receive (804), from an online store, online transaction information, the online transaction can include a history of purchases or returns at the online store and a timestamp associated with each purchase and return.

Merchant advisory system 124 can determine (806), based on the online transaction information and offline transaction information, a purchase pattern. The purchase pattern can include a time and location based likelihood that an item or a type of items being purchased. The location can include at least one of a physical location corresponding to the physical store, a link to the online store, or an estimated geographic location of a user purchasing an item in the online store.

Merchant advisory system 124 can determine (808), based on the likelihood and an online inventory of the online store and an offline inventory of the physical store, a preferred strategy of promoting the item or type of items over time and location for targeting online shoppers. The preferred strategy comprises whether to put an item for sale in the online store or in the physical store at a given time.

Merchant advisory system 124 can provide (810) a recommendation to a merchant based on the preferred strategy. The merchant can be an operator of the online store and the physical store.

Figure 9:
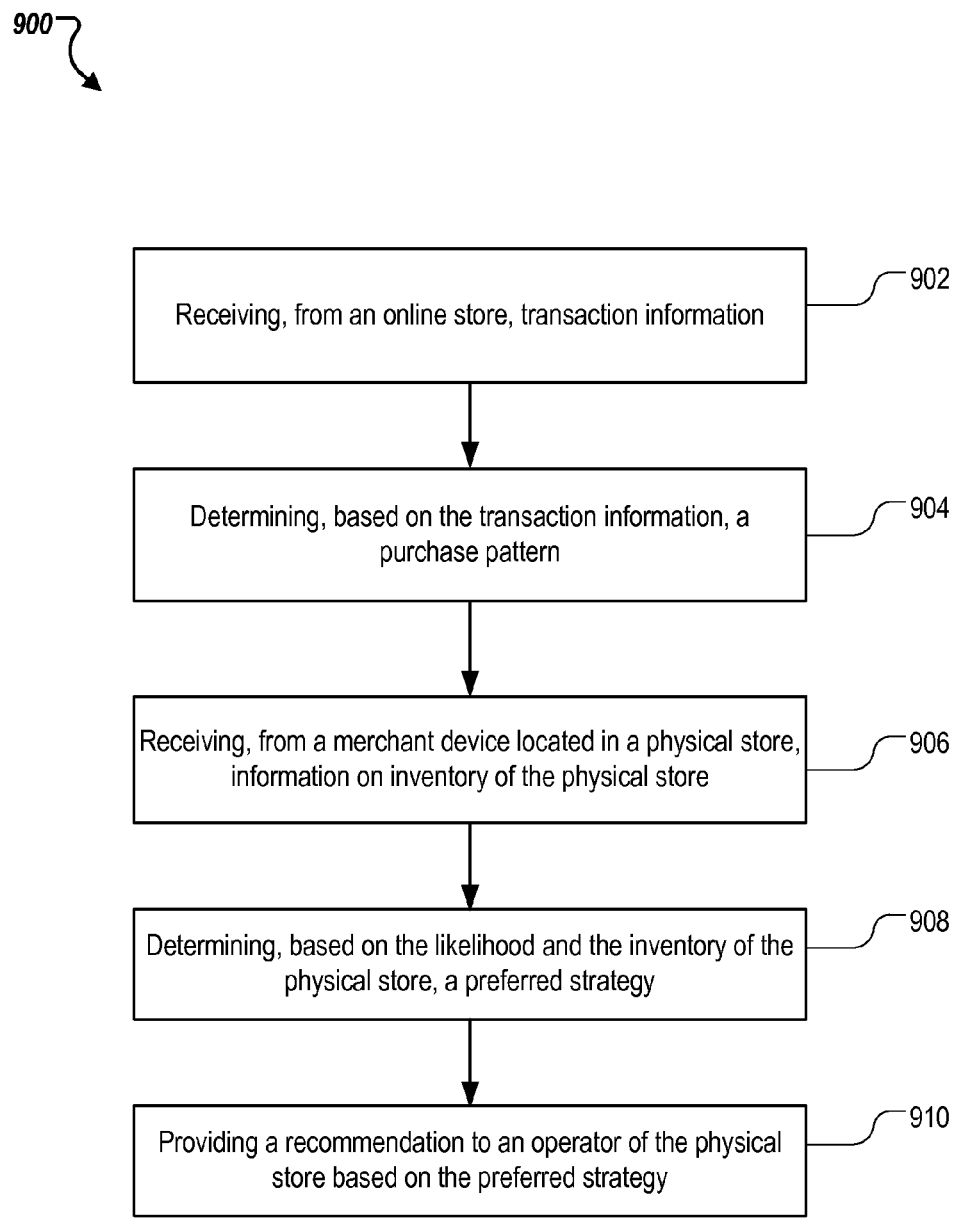
FIG. 9 is a flowchart of an example procedure of providing recommendations to physical stores using online sales data.

FIG. 9 is a flowchart of example procedure 900 of providing recommendations to physical stores using online sales data. Procedure 900 can be performed by merchant advisory system 124.

Merchant advisory system 124 can receive (902), from an online store, transaction information. The transaction information including a history of purchases or returns that occurred at the online store and a timestamp associated with each purchase and return.

Merchant advisory system 124 can determine (904), based on the transaction information, a purchase pattern. The purchase pattern can include a time and location based likelihood that an item or a type of items being purchased.

Merchant advisory system 124 can receive (906), from a merchant device located in a physical store, information on inventory of the physical store.

Merchant advisory system 124 can determine (908), based on the likelihood and the inventory of the physical store, a preferred strategy of promoting the item or type of items over time and location for targeting shoppers visiting the physical store.

Merchant advisory system 124 can provide (910) a recommendation to an operator of the physical store based on the preferred strategy.

Figure 10:
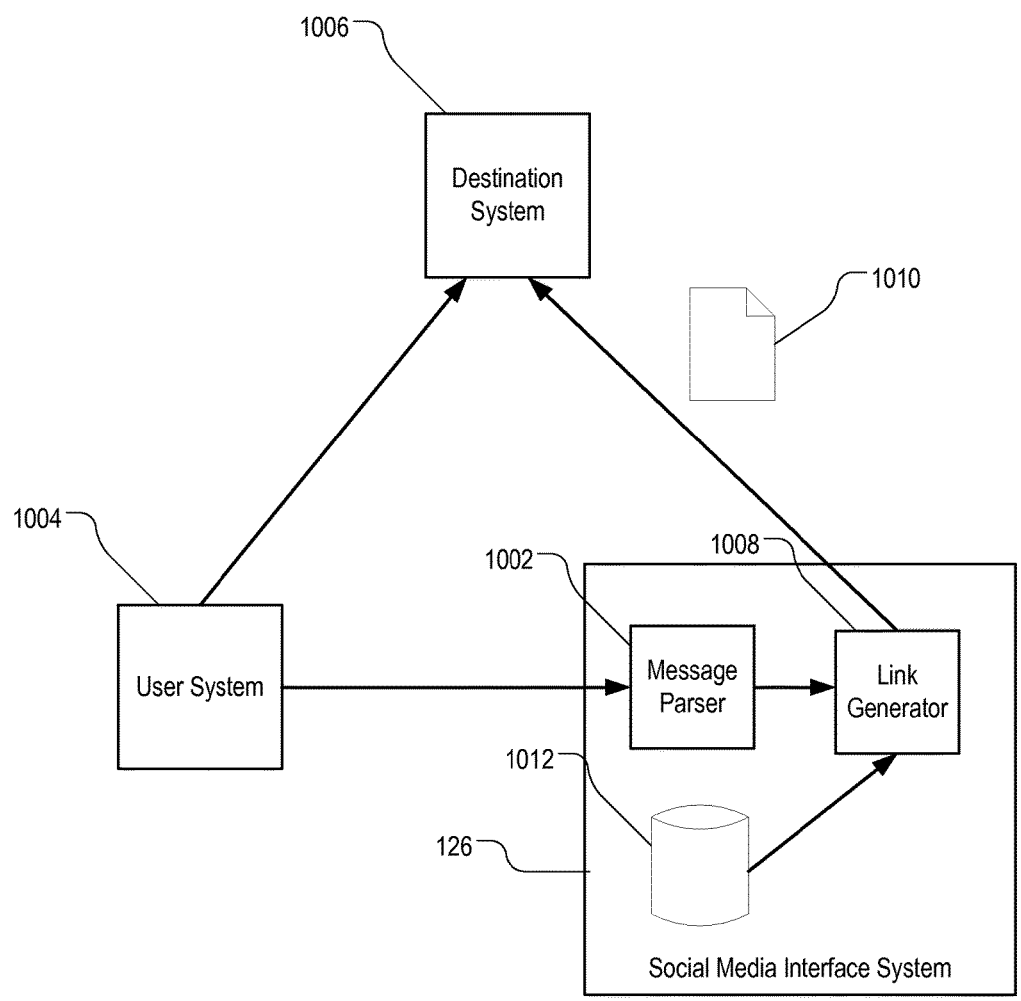
FIG. 10 is block diagram illustrating an example architecture of a social media interface system.

FIG. 10 is block diagram illustrating an example architecture of social media interface system 126. Social media interface system 126 can include hardware, software, and firmware components.

Social media interface system 126 can include message parser 1002. Message parser 1002 is a component of social media interface system 126 configured to receive a duplicate (e.g., copy) of a message from user system 1004 and determine one or more keywords in the duplicate of the message. User system 1004 can be a user device configured to send the message to destination system 1006. The message can be a microblog entry or an electronic mail message. Destination system 1006 can include one or more computers hosting an online service, e.g., a social media site. User device can send a duplicate of the message to social media interface system 126.

Upon receiving the duplicate of the message, message parser 1002 can determine that the one or more keywords include words or phrases (e.g., "for sale" or "X dollars") indicate that the message is likely to be intended for selling or buying an item. Upon the determination, message parser 1002 can request link generator 1008 to generate a link for facilitating a sales transaction.

Link generator 1008 is a component of social media interface system 126 configured to receive a request from message parser 1002, to determine whether an identifier of a sender of the duplicate of the massage matches a registered user identifier (e.g., an account name of a merchant), and in response to the determination, to generate link 1010 based on the one or more keywords and the registered user identifier. Link 1010 can include a uniform resource locator (URL) link to an online store or a payment system (e.g., a payment account on an online or offline payment service) associated with the registered user identifier. One or more components of the link (e.g., account name or item identifier) can be stored in user registry 1012 in association with the registered user identifier. Link generator 1008 can provide link 1010 to destination system 1006, e.g., the online store operated by the payment service system 108.

Upon receiving link 1010, an application program associated with social media interface system 126 can execute on destination system 1006. The application program can insert link 1010 into the message as a hypertext markup language (HTML) tag for associating with the one or more keywords. Accordingly, the keywords (or other part of the message) can be clickable, where a click on the keywords can lead to the online store or payment system.

In some implementations, user system 1004 can send a message (e.g., a submission or an email) to destination system 1006. User system 1004 can send one or more instructions to destination system 1006 for publishing the message. User system 1004 can send the one or more instructions to social media interface system 126. User system 1004 can send the one or more instructions to social media interface system 126 by copying an email message or executing an application program for sending the message. The application program can be authorized to copy the one or more instructions to social media interface system 126. In addition, user system 1004 can provide to social media interface system 126 a destination page or reference to (e.g., web address for accessing) a destination page. The destination page can be a page that the message is published in a social media by destination system 1006.

Upon receiving the one or more instructions and the destination page or reference, link generator 1008 of social media interface system 126 can generate link 1010, and provide link 1010 to destination system 1006.

An application executing on destination system 1006 can parse the message to identify one or more keywords that indicate intent to sell or buy. Upon identifying the keywords, destination system 1006 can associate link 1010 with the keywords (e.g., by inserting an HTML tag). In some implementations, user system 1004 can authorize social media interface system 126 to modify a user's destination page on destination system 1006. For example, the user can add a friend to an account on destination system 1006. The user can designate an account on social media interface system 126 as the friend. The user can give the friend the permission to edit the user's destination page. Accordingly, link generator 1008 of social media interface system 126 can modify the destination page and insert link 1010.

In some implementations, user system 1004 is a merchant device, located in a physical store. The user system 1004 can display an offline storefront. The offline store front can include user interface 220, as described in reference to FIG. 2B. The user device receives a change, e.g., an input from the merchant making a note "50% discount today" on an item "sandwich" listed in user interface 220. The merchant can have a parallel online storefront and a social media account where the merchant promotes items carried by the merchant. The note can trigger social media interface system 126 to generate a message indicating the discount in an online storefront of the merchant, a web marketplace of the merchant, or the social media site where the merchant participates. Destination system 1006 can include an inventory management system, a server of the online store, a server of the web market place, or a server of the social media site. The social media interface system 126 parses the note to determine link 1010 to the online storefront to be generated, inserts the link 1010 to a message, and posts the message on destination system 1006.

In some implementations, the social media interface system 126 provides an online storefront and a mirror of the storefront on destination system 1006, which can include a server of a social media site. The social media interface system 126 can automatically convert notes of the merchant as received from user system 1004 to social media posts, e.g., posts about discounts. If the merchant has an online storefront managed by or registered with the social media interface system 126, the social media interface system 126 can mirror notes to the social media site. For example, each time the merchant indicates that there is a discount in the physical store or in the online store, user device 1004 can notify the social media interface system 126. The social media interface system 126 then generates messages for posting on the social media site about the discount. The posts can include link 1010 embedded as HTML tags.

In some implementations, user system 1004 is a merchant device located at a physical store of a merchant or a server of an online store of the merchant. The merchant has a social media presence at a social media site. Destination system 1006 is a server of the social media site. The social media interface system 126 makes it easier for the merchant to insert links to a storefront of the physical store or the online store when the merchant make posts. For example, a merchant operating "My Baker Shop" posts a message on social media site indicating "50% discount sandwich today." The social media interface system 126 identifies a keyword "discount" in the post. In addition, the social media interface system 126 analyzes the post to see "sandwich" as the item. In response to the identifications, the social media interface system 126 determines a link 1010 to a storefront of "My Baker Shop" using pre-registered information of the merchant. The social media interface system 126 converts the original message by embedding the link 1010 as a tag to the term "sandwich" and posts the converted message to the social media site. Even when the merchant does not know specific URLs to the specific item "sandwich" in the storefront, the social media interface system 126 allows the merchant conduct marketing on social media. The merchant can control which messages on items get converted and posted, for example, using one-click listing selection 235 or one-click listing selection 235 as described above in reference to FIG. 2B.

In some implementations, social media interface system 126 receives a copy of an electronic message sent from user system 1004, e.g., a merchant computer of a merchant, to destination system 1006, e.g., an inventory management system for updating an inventory of items for sale at a physical store of the merchant or an online store of the merchant. A message parser 1002 of the social media interface system 126 parses the copy of electronic message to determine one or more keywords in the electronic message, e.g., "discount" and "sandwich." The message parser 1002 can determine that the one or more keywords indicate that the electronic message describes an item that is offered by the merchant to sell at the physical store or the online store. In making the determination, the message parser 1002 can identify one or more words or phrases, e.g., "discount" indicating an offer to sell, and identify the item from the inventory records stored on an inventory management system coupled to the social media interface system 126 using at least one of the one or more keywords, e.g., "sandwich."

In response to the determining, a link generator 1008 retrieves a link 1010 from a user registry 1012 using an account name of the merchant. The link 1010 is directed to the online store of the merchant or includes an address of the physical store. The link 1010 can be associated with the account name in the user registry 1012, and can be previously entered by the merchant or generated for the merchant.

The link generator 1008 inserts the link 1010 as a tag on the one or more keywords, e.g., on "sandwich" or "discount" or both, of the electronic message. The tag can be an HTML tag that causes the one or more keywords, upon receiving a click or touch input when being viewed in the browser, to direct the browser to display a web page of the online store, or to display a location of the physical store corresponding to the address. The link generator 1008 can post the electronic message that includes the tag on destination system 106, e.g., in an account of the merchant on a social media site.

In some implementations, social media interface system 126 receives a duplicate of an electronic message sent by a merchant from a user system 1004 to destination system 1006, e.g., a server of a social network site storing messages of the merchant and providing the stored messages for display in a browser.

A message parser 1002 of the social network interface system 126 parses the duplicate of the electronic message to determine one or more keywords in the electronic message. The message parser 1002 can determine that the one or more keywords indicate that the message describes an item that is offered by the merchant to sell at an online store of the merchant. In response, a link generator 1008 can retrieve a link 1010 from a user registry 1012 using an account name of the merchant. The link 1010 is directed to the online store of the merchant and is associated with the account name in the user registry 1012. The link 1010 can be previously entered by the merchant or generated for the merchant. The link generator 1008 can provide the link 1010 to a server of the social network site for posting in a message on the social media site. In some implementations, providing the link 1010 to the server includes providing the link 1010 to an application program that executes on a server of the social network site for inserting the link 1010 as a tag of the one or more keywords of the electronic message. In some implementations, providing the link 1010 to the server includes generating the message that includes the link 1010 as a tag and providing the message to the server for posting in the social media site.

Figure 11:
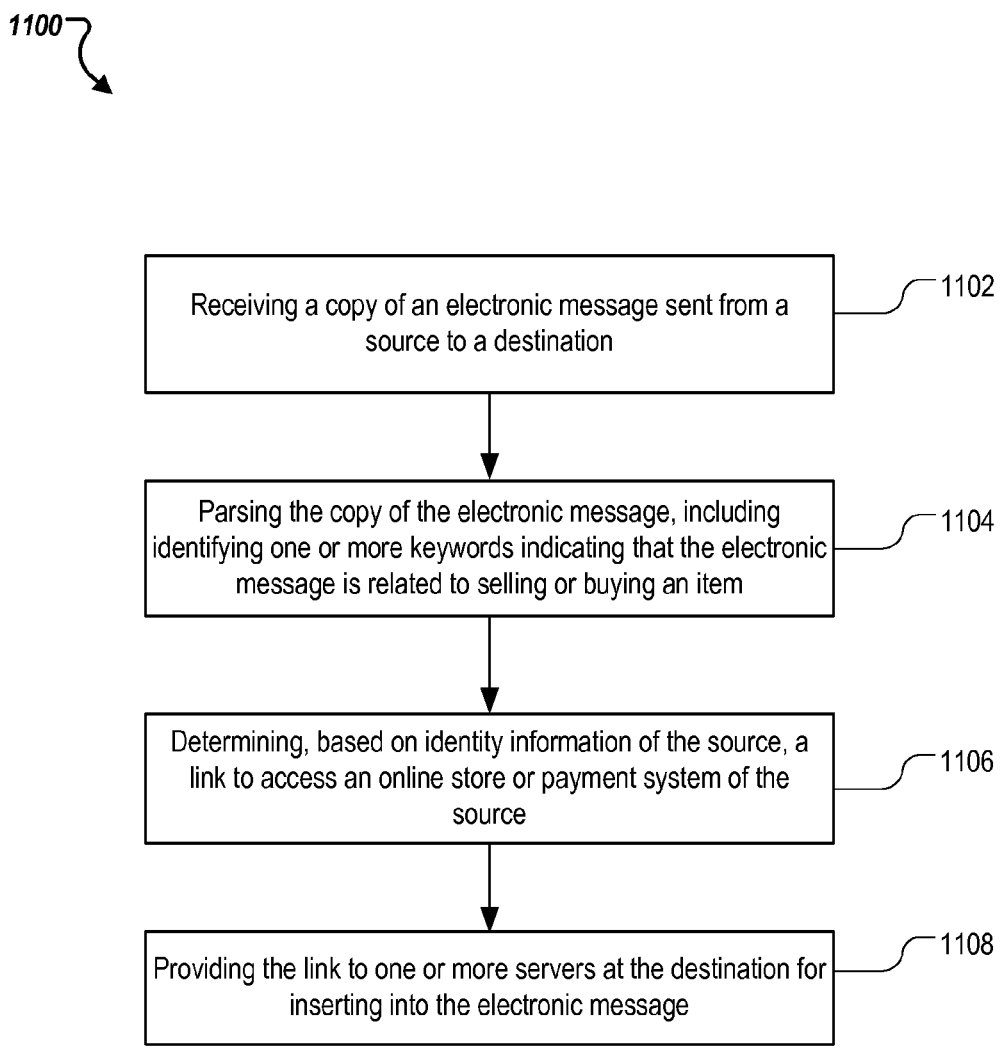
FIG. 11 is a flowchart of an example procedure of inserting links into electronic messages.

FIG. 11 is a flowchart of example procedure 1100 of inserting links into electronic messages. Procedure 1100 can be performed by social media interface system 126.

Social media interface system 126 can receive (1102) a duplicate (e.g., a copy) of an electronic message sent from a source to a destination. The destination can include one or more servers programmed to provide a social media or microblogging service. The electronic message can be an electronic mail or a feed to the social media or microblogging service Social media interface system 126 can parse (1104) the duplicate of the electronic message. During the parsing, social media interface system 126 can identify one or more keywords indicating that the electronic message is related to selling or buying an item.

In response, social media interface system 126 can determine (1106), based on identity information of the source, a link to access an online store or payment system of the source. The identify information includes a registered user identifier of the source. The online store or payment system can be configured to facilitate the selling or buying.

Social media interface system 126 can provide (1108) the link to one or more servers at the destination for inserting into the electronic message. The link can include an HTML tag for associating with the one or more keywords.

Figure 12:
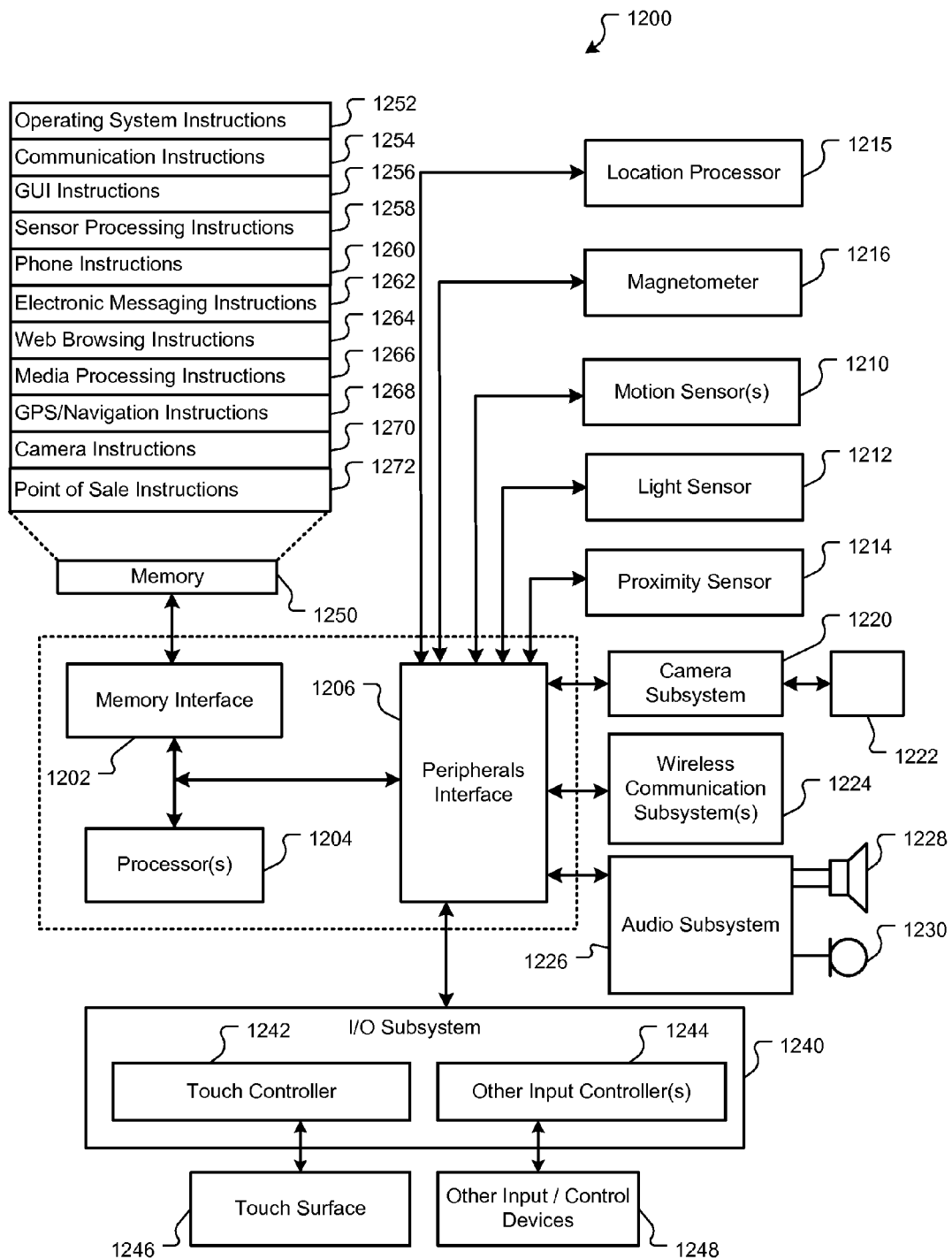
FIG. 12 is a block diagram of an exemplary architecture of a computing device configured to perform the operations of FIGS. 1-11.

FIG. 12 is a block diagram of an exemplary architecture of a computing device capable of serving as a point of sale. Architecture 1200 can be implemented in a computing device for generating the features described in reference to FIGS. 1-11, including but not limited to portable or desktop computers, smart phones and electronic tablets, television systems, game consoles, kiosks and the like. Architecture 1200 can include memory interface 1202, data processor(s), image processor(s) or central processing unit(s) 1204, and peripherals interface 1206. Memory interface 1202, processor(s) 1204 or peripherals interface 1206 can be separate components or can be integrated in one or more integrated circuits. The various components can be coupled by one or more communication buses or signal lines.

Sensors, devices, and subsystems can be coupled to peripherals interface 1206 to facilitate multiple functionalities. For example, motion sensor 1210, light sensor 1212, and proximity sensor 1214 can be coupled to peripherals interface 1206 to facilitate orientation, lighting, and proximity functions of the device. For example, in some implementations, light sensor 1212 can be utilized to facilitate adjusting the brightness of touch surface 1246. In some implementations, motion sensor 1210 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 1206, such as a temperature sensor, a biometric sensor, or other sensing device, to facilitate related functionalities.

Location processor 1215 (e.g., GPS receiver) can be connected to peripherals interface 1206 to provide geopositioning. Electronic magnetometer 1216 (e.g., an integrated circuit chip) can also be connected to peripherals interface 1206 to provide data that can be used to determine the direction of magnetic North. Thus, electronic magnetometer 1216 can be used as an electronic compass.

Camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 1224. Communication subsystem(s) 1224 can include one or more wireless communication subsystems. Wireless communication subsystems 1224 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 1224 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 1224 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 1226 can be coupled to a speaker 1228 and one or more microphones 1230 to facilitate voice-enabled functions, such as voice recognition, voice replication, digital recording, and telephony functions.

I/O subsystem 1240 can include touch controller 1242 and/or other input controller(s) 1244. Touch controller 1242 can be coupled to a touch surface 1246. Touch surface 1246 and touch controller 1242 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 1246. In one implementation, touch surface 1246 can display virtual or soft buttons and a virtual keyboard, which can be used as an input/output device by the user.

Other input controller(s) 1244 can be coupled to other input/control devices 1248, such as one or more buttons, rocker switches, thumb-wheel, infrared port, USB port, and/or a pointer device such as a stylus. The one or more buttons (not shown) can include an up/down button for volume control of speaker 1228 and/or microphone 1230.

In some implementations, the computing device implementing architecture 1200 can present recorded audio and/or video files, such as MP3, AAC, and MPEG files. In some implementations, the computing device can include the functionality of an MP3 player and may include a pin connector for tethering to other devices. Other input/output and control devices can be used.

Memory interface 1202 can be coupled to memory 1250. Memory 1250 can include high-speed random access memory or non-volatile memory, such as one or more magnetic disk storage devices, one or more optical storage devices, or flash memory (e.g., NAND, NOR). Memory 1250 can store operating system 552, such as Darwin, RTXC, LINUX, UNIX, OS X, WINDOWS, or an embedded operating system such as VxWorks. Operating system 1252 may include instructions for handling basic system services and for performing hardware dependent tasks. In some implementations, operating system 1252 can include a kernel (e.g., UNIX kernel).

Memory 1250 may also store communication instructions 1254 to facilitate communicating with one or more additional devices, one or more computers or servers. Communication instructions 1254 can also be used to select an operational mode or communication medium for use by the device, based on a geographic location (obtained by the GPS/Navigation instructions 1268) of the device. Memory 1250 may include graphical user interface instructions 1256 to facilitate graphic user interface processing; sensor processing instructions 1258 to facilitate sensor-related processing and functions; phone instructions 1260 to facilitate phone-related processes and functions; electronic messaging instructions 1262 to facilitate electronic-messaging related processes and functions; web browsing instructions 1264 to facilitate web browsing-related processes and functions and display GUIs; media processing instructions 1266 to facilitate media processing-related processes and functions; GPS/Navigation instructions 1268 to facilitate GPS and navigation-related processes; camera instructions 1270 to facilitate camera-related processes and functions; and POS instructions 1272 for causing the device to perform operations of a POS device. The memory 1250 may also store other software instructions for facilitating other processes, features and applications, such as applications related to navigation, social media, location-based services or map displays.

Each of the above identified instructions and applications can correspond to a set of instructions for performing one or more functions described above. These instructions need not be implemented as separate software programs, procedures, or modules. Memory 1250 can include additional instructions or fewer instructions. Furthermore, various functions of the computing device may be implemented in hardware and/or in software, including in one or more signal processing and/or application specific integrated circuits.

Figure 13:
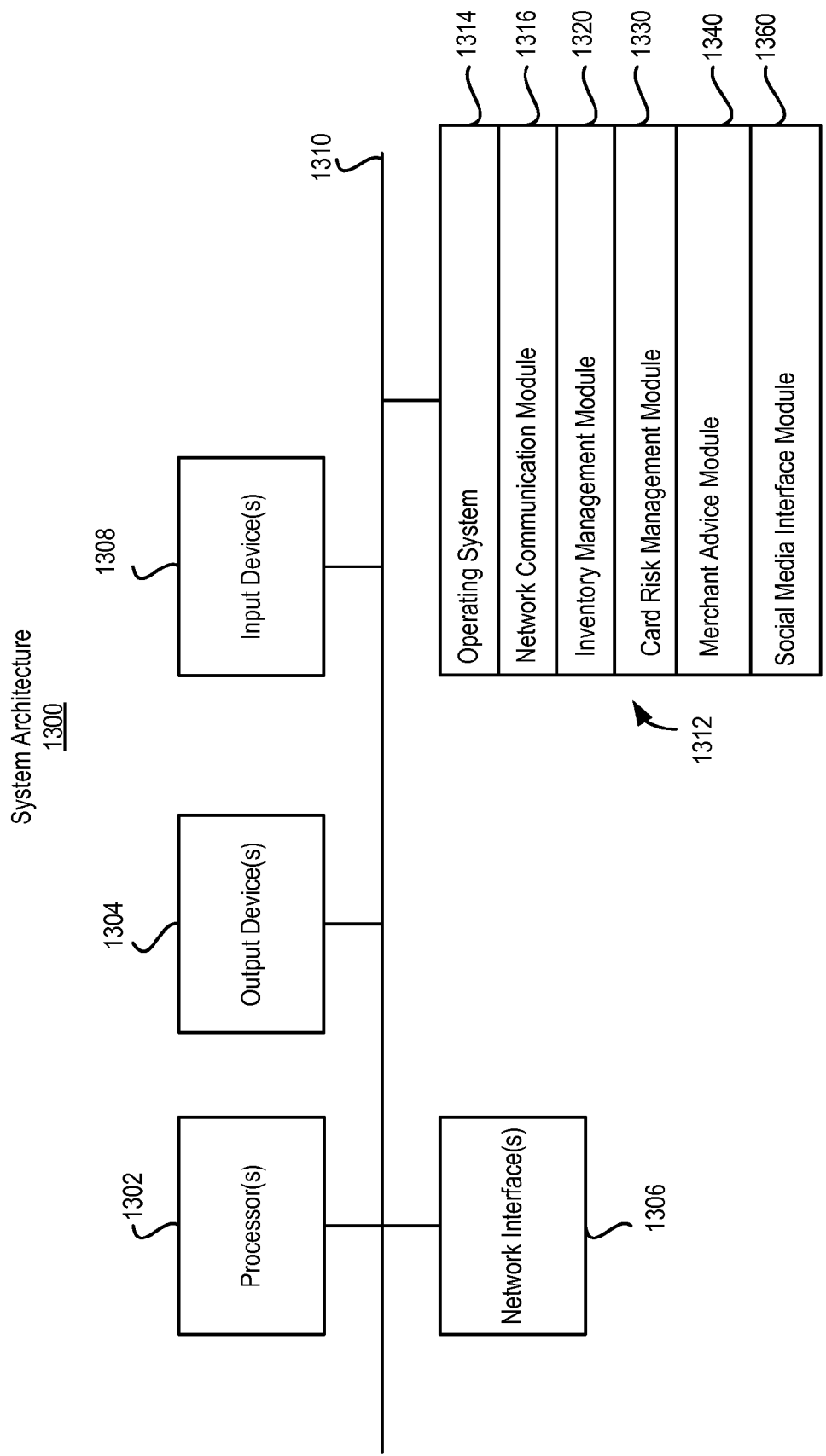
FIG. 13 is a block diagram of an exemplary system architecture for implementing the features and operations of FIGS. 1-11.

FIG. 13 is a block diagram of an exemplary system architecture 1300 for implementing the features and operations of FIGS. 1-11. Other architectures are possible, including architectures with more or fewer components. In some implementations, architecture 1300 includes one or more processors 1302 (e.g., dual-core Intel® Xeon® Processors), one or more output devices 1304 (e.g., LCD), one or more network interfaces 1306, one or more input devices 1308 (e.g., mouse, keyboard, touch-sensitive display) and one or more computer-readable mediums 1312 (e.g., RAM, ROM, SDRAM, hard disk, optical disk, flash memory, etc.). These components can exchange communications and data over one or more communication channels 1310 (e.g., buses), which can utilize various hardware and software for facilitating the transfer of data and control signals between components.

The term "computer-readable medium" refers to a medium that participates in providing instructions to processor 1302 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1312 can further include operating system 1314 (e.g., a Linux® operating system), network communication module 1316, inventory management module 1320, card risk management module 1330, merchant advice module 1340, and social media interface module 1360. Operating system 1314 can be multi-user, multiprocessing, multitasking, multithreading, real time, etc. Operating system 1314 performs basic tasks, including but not limited to: recognizing input from and providing output to devices 1306, 1308; keeping track and managing files and directories on computer-readable mediums 1312 (e.g., memory or a storage device); controlling peripheral devices; and managing traffic on the one or more communication channels 1310. Network communications module 1316 includes various components for establishing and maintaining network connections (e.g., software for implementing communication protocols, such as TCP/IP, HTTP, etc.).

Inventory management module 1320 can include computer instructions that, when executed, cause processor 1302 to perform operations of inventory management subsystem 120. Card risk management module 1330 can include computer instructions that, when executed, cause processor 1302 to perform operations of card risk management system 122. Merchant advice module 1340 can include computer instructions that, when executed, cause processor 1302 to perform operations of merchant advisory system 124. Social media interface module 1360 can include computer instructions that, when executed, cause processor 1302 to perform operations of social media interface system 126.

Architecture 1300 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a touch sensitive display screen for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, a PAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method for managing unified inventory between online stores and physical stores, comprising:
    storing, at an inventory management system, an inventory of items for sale, the inventory of items including:
        (i) an offline inventory of items associated with a merchant, the offline inventory of items including a first item that is associated with a first flag in a database indicating that the first item is designated for sale at a physical store where a buyer can visit personally, and
        (ii) an online inventory of items associated with the merchant, the online inventory of items including a second item that is associated with a second flag in the database indicating that the second item is designated for sale via an online store accessible by online buyers using a buyer application program or a web browser;
    providing, by the inventory management system via a network, a first list of items in the inventory of items to a merchant device located at the physical store for display to the merchant at the physical store, wherein the first list of items includes a record of the first item but either excludes a record of the second item or includes the record of the second item and an indicator that the second item is not for sale at the physical store;
    providing, by the inventory management system via the network, a second list of items in the inventory of items to a server of the online store for serving to the buyer application program or the web browser, wherein the second list of items includes a record of the second item but either excludes a record of the first item or includes a record of the first item and an indicator that the first item is not for sale via the online store;
providing, by the inventory management system, and to the merchant device via the network, a graphical user interface (GUI) for designating items for sale at one or more of the online store or the physical store, the GUI including at least:
   a first representation of the first item designated for sale at the physical store where the buyer can visit personally;
   a second representation of the second item designated for sale at the online store;
   a first graphical element, selection of which, causes the first item to be listed for sale at the online store; and
   a second graphical element, selection of which, causes the first item to be listed for view at the online store, wherein the first item can be viewed through the online store and purchased at the physical store of the merchant;
receiving, by the inventory management system, and from the merchant device, an indication of a first input associated with a selection of the first representation of the first item;
receiving, by the inventory management system, and from the merchant device, a notification of a second input associated with a selection of the first graphical element or the second graphical element;
based at least in part on receiving the indication and the notification, synchronizing, by the inventory management system, the online inventory of items and the offline inventory of items based at least in part on:
   associating the second flag with the first item indicating that the first item is designated for sale via the online store; and
   generating, based at least in part on associating the second flag with the first item, an updated second list of items including at least the record of the first item and the record of the second item;
providing, by the inventory management system via the network, the updated second list of items to the server of the online store; and
causing the first item to be listed for sale via the online store.

2. The method of claim 1, wherein:
the notification further indicates that the second input specifies that an in-store discount at the physical store is applicable to the first item to the online buyers; and
the record of the first item in the updated second list of items is associated with an indicator of the in-store discount.

3. The method of claim 1, wherein:
the notification further indicates that the second input specifies a quantity of the first item that is available to the online buyers; and
the record of the first item in the updated second list of items is associated with the quantity.

4. A method, performed by one or more servers of an inventory management service, the method comprising:
storing, in at least one database associated with the one or more servers, an inventory of items for a merchant, the inventory of items including (i) one or more first items associated with a first flag indicating that the one or more first items are associated with an online inventory of items associated with the merchant and (ii) one or more second items associated with a second flag indicating that the one or more second items are associated with an offline inventory of items associated with the merchant;
causing, by the one or more servers, a first graphical user interface (GUI) to be presented via a merchant device operated by the merchant at a physical store of the merchant, the first GUI including:
   a first GUI element associated with a representation of a specific item of the inventory of items, the specific item associated with the second flag indicating an association with the offline inventory of items;
   a second GUI element associated with a first selection, interaction with which causes the specific item to be an online item, the online item being (i) for view via an online store of the merchant and for purchase at the physical store or (ii) for sale via the online store; and
   a third GUI element associated with a second selection, interaction with which causes the specific item to be an offline item, the offline item being for sale at the physical store;
receiving, from the merchant device and at the one or more servers, an indication of an input associated with an interaction with at least the second GUI element;
changing, in response to receiving the indication of the input and by the one or more servers, a status associated with the specific item based at least in part on associating the first flag with the specific item to indicate that the specific item is associated with the online inventory of items;
sending, from the one or more servers and to the merchant device, and responsive to changing the status associated with the specific item, a list of at least the one or more second items associated with the second flag, the list including the specific item and indicating that the specific item is available online or at the physical store; and
causing, by the one or more servers, the list of at least the one or more second items to be presented via a second GUI displayed via the merchant device operated by the merchant at the physical store.

5. The method of claim 4, wherein the input further indicates an interaction with the first GUI element.

6. The method of claim 4, further comprising:
receiving, from the merchant device located at the physical store, information on an offline transaction of purchasing the specific item at the physical store;
generating an online receipt based at least in part on the information on the offline transaction, the online receipt comprising an electronic document specifying a time, a location, a price, and an item name of the offline transaction; and
providing the online receipt to a user device upon request.

7. The method of claim 4, further comprising:
receiving an additional input for sharing an attribute of the specific item between the online inventory of items and the offline inventory of items; and
in response, adding the attribute to a record of the specific item in the online inventory of items according to the attribute of the specific item in the offline inventory of items or adding the attribute to a record of the specific item in the offline inventory of items according to the attribute of the specific item in the online inventory of items.

8. The method of claim 4, further comprising sending, from the one or more servers to another server associated with the online store, another list of at least the one or more first items associated with the first flag, the other list also including the specific item.

9. A system comprising:
one or more processors; and
a non-transitory storage device storing computer instructions operable to cause the one or more processors to perform operations comprising:
storing, in at least one database associated with the system, an inventory of items for a merchant, the inventory of items including (i) one or more first items associated with a first flag indicating that the one or more first items are associated with an online inventory of items associated with the merchant and (ii) one or more second items associated with a second flag indicating that the one or more second items are associated with an offline inventory of items associated with the merchant;
generating a graphical user interface (GUI) to be presented via a merchant device operated by the merchant at a physical store of the merchant, the GUI including:
a first GUI element associated with a representation of a specific item of the inventory of items;
a second GUI element associated with a first selection, interaction with which causes the specific item to be associated with the first flag as an online item, the online item being an item for sale through an online store; and
a third GUI element associated with a second selection, interaction with which causes the specific item to be associated with the second flag as an offline item, the offline item being for sale at the physical store;
providing the GUI to the merchant device via a network;
receiving, from the merchant device, an indication of an input associated with an interaction with at least the second GUI element or the third GUI element;
determining, in response to receiving the indication of the input, a status associated with the specific item based at least in part on associating one or more of the first flag or the second flag with the specific item to indicate whether the specific item is associated with at least one of the online inventory of items or the offline inventory of items;
sending, to the merchant device, a list of at least the one or more second items associated with the second flag; and
causing the list of at least the one or more second items to be presented via a second GUI displayed via the merchant device operated by the merchant at the physical store.

10. The system of claim 9, wherein the input further indicates an interaction with the first GUI element.

11. The system of claim 9, the operations further comprising:
receiving, from the merchant device, information on an offline transaction of purchasing the specific item at the physical store;
generating an online receipt based at least in part on the information on the offline transaction, the online receipt comprising an electronic document specifying a time, a location, a price, and an item name of the offline transaction; and
providing the online receipt to a device user upon request.

12. The system of claim 9, the operations further comprising:
receiving an additional input for sharing an attribute of the specific item between the online inventory of items and the offline inventory of items; and
in response, adding the attribute to a record of the specific item in the online inventory of items according to the attribute of the specific item in the offline inventory of items or adding the attribute to a record of the specific item in the offline inventory of items according to the attribute of the specific item in the online inventory of items.

13. The system of claim 12, wherein the attribute is a discount status, discount amount, or quantity.

14. The system of claim 9, the operations further comprising sending, to one or more servers associated with the online store, another list of at least the one or more first items associated with the first flag.

15. A non-transitory storage device storing computer instructions that, when executed by one or more processors, cause the one or more processors to perform operations comprising:
storing, in at least one database, an inventory of items for a merchant, the inventory of items including (i) one or more first items associated with a first flag indicating that the one or more first items are associated with an online inventory of items associated with the merchant and (ii) one or more second items associated with a second flag indicating that the one or more second items are associated with an offline inventory of items associated with the merchant;
causing a graphical user interface (GUI) to be presented via a merchant device operated by the merchant at a physical store of the merchant, the GUI including:
a first GUI element associated with a representation of a specific item of the inventory of items;
a second GUI element associated with a first selection, interaction with which causes the specific item to be associated with the first flag as an online item, the online item being (i) for view via an online store of the merchant and for purchase at the physical store or (ii) for sale via the online store; and
a third GUI element associated with a second selection, interaction with which causes the specific item to be associated with the second flag as an offline item, the offline item being for sale at the physical store;
receiving, from the merchant device, an indication of an input associated with an interaction with at least the second GUI element or the third GUI element;
determining, in response to receiving the indication of the input, a status associated with the specific item based at least in part on associating one or more of the first flag or the second flag with the specific item to indicate whether the specific item is associated with at least one of the online inventory of items or the offline inventory of items;
sending, to the merchant device, a list of at least the one or more second items associated with the second flag; and
causing the list of at least the one or more second items to be presented via a second GUI displayed via the merchant device operated by the merchant at the physical store of the merchant.

16. The non-transitory storage device of claim 15, wherein the input further indicates an interaction with the first GUI element.

17. The non-transitory storage device of claim 15, the operations further comprising:
- receiving, from the merchant device, information on an offline transaction of purchasing the specific item at the physical store;
- generating an online receipt based at least in part on the information on the offline transaction, the online receipt comprising an electronic document specifying a time, a location, a price, and an item name of the offline transaction; and
- providing the online receipt to a device user upon request.

18. The non-transitory storage device of claim 15, the operations further comprising:
- receiving an additional input for sharing an attribute of the specific item between the online inventory of items and the offline inventory of items; and
- in response, adding the attribute to a record of the specific item in the online inventory of items according to the attribute of the specific item in the offline inventory of items or adding the attribute to a record of the specific item in the offline inventory of items according to the attribute of the specific item in the online inventory of items.

19. The non-transitory storage device of claim 18, wherein the attribute is a discount status, discount amount, or quantity.

20. The non-transitory storage device of claim 15, the operations further comprising sending, to one or more servers associated with the online store, another list of at least the one or more first items associated with the first flag.

21. The method of claim 1, wherein providing the GUI comprises providing, by the inventory management system, and to the merchant device via the network, the GUI for display in a merchant web browser executable on the merchant device.

* * * * *